(12) United States Patent
Shafer et al.

(10) Patent No.: US 7,046,459 B1
(45) Date of Patent: May 16, 2006

(54) CATADIOPTRIC REDUCTIONS LENS

(75) Inventors: David R. Shafer, Fairfield, CT (US);
Alexander Epple, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

(21) Appl. No.: 10/869,943

(22) Filed: Jun. 18, 2004

Related U.S. Application Data

(63) Continuation of application No. PCT/EP02/13887, filed on Dec. 7, 2002.

(60) Provisional application No. 60/340,275, filed on Dec. 18, 2001.

(51) Int. Cl.
*G02B 17/00* (2006.01)

(52) U.S. Cl. .................. 359/727; 359/732; 359/364

(58) Field of Classification Search ............... 359/366, 359/727, 362, 364, 663, 649, 650, 651, 708, 359/726, 728, 730, 732, 733, 737, 741
See application file for complete search history.

(56) References Cited

U.S. PATENT DOCUMENTS

| | | | |
|---|---|---|---|
| 5,052,783 A | 10/1991 | Hamada | 349/5 |
| 5,668,673 A * | 9/1997 | Suenaga et al. | 359/731 |
| 5,673,135 A * | 9/1997 | Yoshino et al. | 359/196 |
| 5,691,802 A | 11/1997 | Takahashi | 355/53 |
| 5,969,882 A | 10/1999 | Takahashi | 359/728 |
| 5,999,333 A | 12/1999 | Takahashi | 359/726 |
| 6,157,498 A | 12/2000 | Takahashi | 359/728 |
| 6,496,306 B1 | 12/2002 | Shafer et al. | 359/355 |
| 2002/0196533 A1 | 12/2002 | Shafer et al. | 359/355 |
| 2003/0011755 A1 | 1/2003 | Yasuhiro | 355/67 |
| 2003/0039028 A1 * | 2/2003 | Oskotsky et al. | 359/366 |
| 2004/0075894 A1 * | 4/2004 | Shafer et al. | 359/365 |

FOREIGN PATENT DOCUMENTS

| | | |
|---|---|---|
| DE | 197 26 058 A1 | 1/1998 |
| EP | 0 869 383 A2 | 10/1998 |
| EP | 0 989 434 A | 3/2000 |
| EP | 1 079 253 A1 | 2/2001 |
| JP | 10-010429 | 1/1998 |
| SU | 115 1 908 A | 6/1983 |
| WO | WO 01 652 96 A | 9/2001 |

* cited by examiner

*Primary Examiner*—Thong Nguyen
*Assistant Examiner*—Arnel C. Lavarias
(74) *Attorney, Agent, or Firm*—Sughrue Mion, PLLC

(57) ABSTRACT

A catadioptric projection lens for imaging a pattern arranged in an object plane while creating a real intermediate image, having a catadioptric first lens section having a concave mirror and a beam-deflection device, as well as a dioptric second lens section that follows the catadioptric lens section, between its object plane and image plane. The beam-deflection device deflects radiation coming from the object plane to the concave mirror. Positive refractive power is arranged following the first reflective surface, between the latter and the concave mirror, within an optical near-field of the object plane, within which the height of the principal ray of the outermost field point of radiation coming from the object exceeds the marginal-ray height. The intermediate image is arranged prior to light which forms the intermediate image being reflected by a second reflective surface that is provided for the purpose of allowing arranging the object plane and image plane such that they will be parallel to one another.

37 Claims, 5 Drawing Sheets

CATADIOPTRIC REDUCTIONS LENS

This is a Continuation of International Application PCT/EP02/13887, with an international filing date of Dec. 7, 2002, which was published under PCT Article 21(2) in English, and the disclosure of which is incorporated into this application by reference; the International Application PCT/EP02/13887, in turn, claims priority to U.S. Provisional Application Ser. No. 60/340,275 filed on Dec. 18, 2001.

FIELD OF AND BACKGROUND OF THE INVENTION

The invention relates to a catadioptric projection lens for imaging a pattern arranged in an object plane onto an image plane.

Projection lenses of that type are employed on projection exposure systems, in particular wafer scanners or wafer steppers, used for fabricating semiconductor devices and other types of microdevices and serve to project patterns on photomasks or reticles, hereinafter referred to generically as "masks" or "reticles," onto an object having a photosensitive coating with ultrahigh resolution on a reduced scale.

In order create even finer structures, it will be necessary to both increase the image-end numerical aperture (NA) of the projection lens to be involved and employ shorter wavelengths, preferably ultraviolet light with wavelengths less than about 260 nm.

However, there are very few materials, in particular, synthetic quartz glass and crystalline fluorides, such as calcium fluoride, magnesium fluoride, barium fluoride, lithium fluoride, lithium-calcium-aluminum fluoride, lithium-strontium-aluminum fluoride, and similar, that are sufficiently transparent in that wavelength region available for fabricating the optical elements required. Since the Abbé numbers of those materials that are available lie rather close to one another, it is difficult to provide purely refractive systems that are sufficiently well color-corrected (corrected for chromatic aberrations). Although this problem might be solved by employing purely reflective systems, fabricating such mirror systems involves considerable expense and effort.

In view of the aforementioned problems, catadioptric systems that combine refracting and reflecting elements, i.e., in particular, lenses and mirrors, are primarily employed for configuring high-resolution projection lenses of the aforementioned type.

Whenever imaging reflective surfaces are involved, it will be beneficial to employ beam-deflection devices whenever images free of obscurations and vignetting are to be achieved. Both systems having geometric beamsplitters having one or more fully reflecting deflecting mirrors and systems having physical beamsplitters are known. Additional plane mirrors may also be employed for folding the optical path. However, folding mirrors are usually employed only in order to allow meeting space-occupation requirements, in particular, in order to allow orienting the object and image planes parallel to one another. However, folding mirrors are not absolutely necessary from the optical-design standpoint.

Employing systems having a physical beamsplitter in the form of, for example, a beamsplitter cube (BSC), has the advantage that it allows configuring on-axis systems. Polarization-selective reflective surfaces that either reflect or transmit incident radiation, depending upon the orientation of its polarization axis, are employed in such cases. The disadvantage of employing such systems is that hardly any suitable transparent materials are available in the desired, large volumes. Moreover, fabricating optically active beamsplitter coatings situated within beamsplitter cubes may prove extremely difficult, particularly in cases involving large angles of incidence on the reflective surfaces involved and/or radiation that is incident over a broad range of angles of incidence.

Some of the disadvantages of systems equipped with beamsplitter cubes may be avoided by employing systems having one or more deflecting mirrors in their beam-deflection devices. However, such systems have the inherent disadvantage that they are necessarily off-axis systems, i.e., systems with off-axis object fields.

A catadioptric reduction lens of that type is disclosed in European Patent EP 0 989 434, which corresponds to U.S. Ser. No. 09/364,382. Such lenses have a catadioptric first lens section having a concave mirror and a beam-deflection device arranged between their object plane and their image plane and a dioptric second lens section that is arranged following that first lens section. Their beam-deflection device, which is configured in the form of a reflecting prism, has a first reflective surface for deflecting radiation coming from their object plane to the concave mirror and a second reflective surface for deflecting radiation reflected by the concave mirror to their second lens section, which contains exclusively refractive elements. A positive lens whose refractive power is dimensioned such that the concave mirror lies in the vicinity of the pupil is arranged between the object plane and the first reflective surface. The catadioptric first lens section creates a real intermediate image that is situated a short distance behind the second reflective surface and far in front of the first lens of the second lens section. This intermediate image is thus readily accessible, which may be taken advantage of for the purpose of, e.g., installing an illuminated-field stop. Large maximum angles of incidence, particularly at the first reflective surface, impose stringent demands on the reflective coatings used on the mirrors in order that they will have largely uniform reflectances for all incident radiation.

Another reduction lens that has a beam-deflection device having a deflecting mirror is disclosed in U.S. Pat. No. 5,969,882, which corresponds to European Patent EP A 0 869 383. In the case of this particular system, the deflecting mirror is arranged such that light coming from the lens' object plane initially falls on the concave mirror of its first lens section, which reflects it to the beam-deflection device's deflecting mirror, which reflects it to another reflective surface that deflects it toward the lens of the entirely dioptric second lens section. The elements of the first lens section that are utilized for creating the intermediate image are configured such that the intermediate image lies close to the beam-deflection device's deflecting mirror. The second lens section refocuses the intermediate image onto the image plane, which may be oriented parallel to the object plane, thanks to the reflective surface that follows the intermediate image in the optical train.

U.S. Pat. No. 6,157,498 depicts a similar configuration whose intermediate image lies on, or near, the reflective surface of its beam-deflection device. Several lenses of its second lens section are arranged between the latter and a deflecting mirror located in its second lens section. An aspheric surface is also arranged in the immediate vicinity of, or near to, its intermediate image, and is included exclusively for the purpose of correcting for distortions, without affecting other imaging errors.

A projection lens having a reducing catadioptric lens section and an intermediate image situated in the vicinity of the deflecting mirror of a beam-deflection device is depicted in German Patent DE 197 26 058.

U.S. Pat. No. 5,999,333 depicts another catadioptric reduction lens having deflecting mirrors for which light coming from its object plane, after transiting a lens group having a positive refractive power, initially strikes a concave mirror that reflects it to the beam-deflection device's sole reflective surface. The intermediate image created by its catadioptric lens section lies close to this reflective surface, which reflects light incident thereon to a dioptric second lens section that images the intermediate image onto its image plane. Both its catadioptric lens section and its dioptric lens section create reduced images.

A similarly configured lens for which the intermediate image created by its catadioptric lens section also lies close to its beam-deflecting device's sole deflecting mirror is depicted in Japanese patent application JP-A-10010429. The surface of the lens of the dioptric lens section that follows that lies closest to the deflecting mirror is aspherical in order that it may make a particularly effective contribution to correcting for distortion.

Other lenses having off-axis object fields, a geometric beamsplitter, and a single concave mirror and single intermediate image followed by a dioptric lens section are known from U.S. Pat. No. 5,052,783 A, U.S. Pat. No. 5,691,802, and European patent application EP 1 079 253 A.

Systems whose intermediate image lies near, or on, a reflective surface may be compactly designed. They also allow keeping corrections for the field curvatures of these off-axis illuminated systems small, which simplifies correcting for distortion. However, intermediate images that fall on a reflective surface can be problematical, since, in that case, flaws on the reflective surface will be sharply imaged onto the image plane, and since extremely high irradiance levels may occur at the reflective surface.

Catadioptric systems that have beamsplitters generally have a group of lenses that is transited twice, i.e., are transited by light on its way from their object field to their concave mirror and its way from their concave mirror to their image field. In U.S. Pat. No. 5,691,802, it was proposed that this lens group have positive refractive power, which supposedly would allow employing a concave mirror with a smaller diameter. A system having a single positive lens that is transited twice situated near a deflecting mirror of its beamsplitter is disclosed in U.S. Pat. No. 6,157,498.

The high prices of the materials involved and limited availability of crystalline calcium fluoride in sizes large enough for fabricating large lenses represent problems, particularly in the field of microlithography at 157 nm for very large numerical apertures, NA, of, for example, NA=0.80 and larger. Measures that will allow reducing the number and sizes of lenses employed and simultaneously contribute to maintaining, or even improving, imaging fidelity are thus desired.

SUMMARY OF THE INVENTION

One object of the invention is avoiding the disadvantages of the state of the art. It is another object of the invention to provide a projection lens that may be well-corrected and configured using moderately sized components, while imposing moderate demands on the optical coatings employed on reflective surfaces. It is yet another object of the invention to reduce the number and sizes of lenses employed while maintaining, or improving, optical-imaging performance.

As a solution to these and other objects, the invention, according to one formulation, provides a catadioptric projection lens for imaging a pattern situated in an object plane onto an image plane while creating a real intermediate image, wherein a catadioptric first lens section having a concave mirror, a beam-deflection device, and a second lens section that is arranged following the catadioptric lens section are arranged between the object plane and image plane; the beam-deflection device has a first reflecting surface for deflecting radiation coming from the object plane toward the concave mirror; a positive refractive power is arranged in an optical near-field of the object plane, between the first reflecting surface and the concave mirror; a second reflecting surface for deflecting radiation coming from the concave mirror toward the image plane is provided; and the intermediate image is arranged ahead of the second reflecting surface. Embodiments thereon are stated in the dependent claims. The wording appearing in all claims is herewith made a part of the contents of this description by way of reference thereto.

A catadioptric projection lens in accordance with one formulation of the invention is configured for imaging a pattern arranged in an object plane onto an image plane. It has a catadioptric first lens section having a concave mirror and a beam-deflection device between its object plane and image plane and a second lens section that is preferably dioptric, i.e., has no imaging reflective surfaces, following its catadioptric lens section. The beam-deflection device has a first reflective surface for deflecting radiation coming from the object plane to the concave mirror. This first reflective surface is followed by positive refractive power arranged between this first reflective surface and the concave mirror, in an optical near-field of the object plane. A second reflective surface for deflecting radiation coming from the concave mirror to the image plane is also provided. The intermediate image is arranged to fall ahead of this second reflective surface in the optical train.

The positive refractive power between the object plane and concave mirror is intended to contribute to providing that a pupillary surface of the projection lens will lie in the vicinity of the concave mirror, i.e., either on, or near, the concave mirror. Employing positive refractive power having a suitable power in the aforementioned optical near-field of the object plane also allows arriving at a telecentric configuration of the object end of the projection lens, which will help avoid object-end defocusing errors. The aforementioned "optical near-field of the object plane" is characterized by the fact that therein the principal-ray height of the image exceeds the marginal-ray height.

Moreover, positive refractive power closely following the first reflective surface more strongly refracts the marginal rays of the image due to its being situated at a larger distance from the object plane, and thus where marginal-ray heights are larger, than in the case of known designs. This may be utilized to reduce the diameters of those optical components that follow the positive refractive power, in particular, the optical components of a mirror group containing the concave mirror, while leaving the lens' overall dimensions unaltered. This aids arriving at a design of the catadioptric lens section that conserves materials. In the case of preferred embodiments, this effect is enhanced by providing that the positive refractive power situated in the optical near-field of the object plane is arranged in the vicinity of that end of the latter's optical near-field that is farthest removed from the object, where that vicinity is, in particular, characterized by the fact that the marginal-ray height therein is at least 70% of the principal-ray height, which yields a strong effect of the positive refractive power on the marginal rays.

Arranging this positive refractive power following the first reflective surface allows providing that the principal rays of the image, which are telecentric in the object plane, or nearly parallel to the optical axis of the system, will also be parallel to its optical axis when they strike the first reflective surface. This leads to a significant reduction of range of angles of incidence on the first reflective surface compared to conventional designs, which have positive refractive power arranged between their object plane and their first reflective surface. This will allow keeping the maximum angles of incidence of radiation incident on the first reflective surface smaller and, in some cases, the ranges of angles of incidence of radiation incident thereon narrower, than allowed by the state of the art, depending upon the angle of inclination of the first reflective surface relative to the optical axis of the projection lens. The demands imposed on the optical coating to be employed on the first reflective surface in relation to the range of angles of incidence that must be accommodated are thus relaxed compared to the state of the art in the case of projection lenses according to the invention, which means that relatively simply configured multilayer coatings may be employed in order to arrive at reflectances that are largely uniform over their entire reflective surfaces. The positive refractive power arranged following the first reflective surface is preferably created by a singlet lens.

In the case of preferred embodiments, the angles of incidence of radiation incident on the first reflective surface for an object-end numerical aperture of 0.2125 are around 68° or less, where maximum angles of incidence of 66° or less may even be achieved. In general, the invention allows configuring lenses for which the angle of incidence on their first reflective surface will not exceed $\alpha_0$, where $\alpha_0$ is given by $$\alpha_0 = |\arcsin(\beta * NA)| + \frac{\alpha_{HOA}}{2},$$

where $\beta$ is the magnification of the projection lens, NA is its image-end numerical aperture, and $\alpha_{HOA}$ is the included angle between a segment of the optical axis running orthogonal to the object plane, and, in some cases, image plane, and a segment of the optical axis in the vicinity of a horizontal arm supporting the concave mirror.

In particular, these relatively small maximum angles of incidence are also realizable in the case of embodiments whose first reflective surface is inclined at an angle relative to the optical axis of the projection lens that differs from 45°. The angle of inclination involved may, for example, be 50° or more, in particular, may range from 50° to 55°.

A second reflective surface for deflecting radiation coming from the concave mirror to the second lens section is also provided, which allows orienting the object plane and image plane parallel to one another, which is particularly beneficial in the case of scanner operation. The real intermediate image is arranged in the vicinity of this second reflective surface. Its proximity to this second reflective surface may be so close that the marginal-ray height at this second reflective surface will be less than 20%, in particular, less than 10%, of the semidiameter of the concave mirror. Having an intermediate image of the image in the immediate vicinity of the second reflective surface benefits minimizing the focal ratio of the lens and thus simplifies correcting for imaging errors.

The real intermediate image lies ahead of this second reflective surface in the optical train, which applies to both the marginal-ray intermediate image and the paraxial intermediate image. The intermediate image may be freely accessible, which may be utilized for, e.g., inserting an aperture stop. The short distance between the intermediate image and this second reflective surface eliminates any disturbing effects of surface flaws that may be present on imaging fidelity. The radiant-energy density incident on this reflective surface is also kept low, which can help extend its service life.

Beneficial are embodiments for which at least one lens, preferable precisely one lens, is arranged between the intermediate image and second reflective surface. In such cases, the second reflective surface may be regarded as a folding mirror situated within the dioptric second lens section, whose first lens lies ahead of the intermediate image. This lens may have positive refractive power. In conjunction with the positive refractive power situated closely following the first reflective surface, this approach allows largely symmetric arrangements having a pupil in the vicinity of the concave mirror or main mirror. This will allow setting the magnification, $\beta_M$, from the object plane to the intermediate image close to unity, in particular, to values exceeding 0.95 or larger than unity. Positive refractive power situated following the intermediate image in the optical train can counteract excessive divergence of principle rays following the intermediate image. This approach will allow keeping the diameters of the lenses of the second lens section that follow the intermediate image small, which will allow a design of that lens section that conserves materials. The refractive power between the intermediate image and the second reflective surface may be low, and may also be negative. The entire intermediate image should preferably lie outside any optical materials in order that problems due to optical components being subjected to high radiant-energy densities, which may occur due to the high radiant-energy densities in the vicinity of the intermediate image, will be avoided.

Arranging at least one lens having at least one aspherical surface between the intermediate image and the second reflective surface will allow achieving a particularly effective correction for, e.g., distortion.

In the case of a, from the design standpoint, particularly beneficial embodiment, the first reflective surface is assigned to a first illuminated area and the second reflective surface is assigned to a second illuminated area, where a projection of the first illuminated area and a projection of the second illuminated area along a segment of the optical axis assigned to the concave mirror overlap one another. Viewed from the concave mirror, the "footprints" of light rays on the reflective surfaces are thus longitudinally offset with respect to one another such that the "footprint" closer to the concave mirror will partially obscure the more distant "footprint." This generates leeway in designing the lens, particularly that portion of the lens close to the intermediate image. In the case of such embodiments, the first and second reflective surfaces may be applied to separate substrates, which may be rigidly connected to one another using a mounting fixture, if necessary. In the case of other embodiments, in particular, such having nonoverlapping "footprints," the reflective surfaces may be formed on a common prism.

Under an advance on the invention, refractive power, preferably positive refractive power, is arranged between the first reflective surface and the concave mirror, and refractive power, preferably positive refractive power, arranged between the concave mirror and the intermediate image is provided by at least one lens that is transited twice. This approach conserves material and simplifies the mechanical structure of the lens. In particular, at least one lens or lens group may be arranged outside the optical near-field, within a central zone between the first reflective surface and the concave mirror. This central zone is preferably characterized both by a principal-ray height that is less than the marginal-ray height and its being located so far away from the concave mirror that the marginal-ray height therein is more than about 70% of the marginal-ray height at the concave mirror. It has been found that arranging positive refractive power within this central zone, and/or within the adjacent zone at the end of the optical near-field, allows influencing the magnification of the catadioptric lens section in particularly beneficial manners. The positive refractive power situated within that zone, or zones, may be chosen so large that the next intermediate image generated on the return path from the concave mirror will be highly overcorrected.

Beneficial variations are characterized by at least one multigrade lens (mosaic lens) that has a first lens zone that is transited in a first transmission direction and a second lens zone that is transited in a second transmission direction, where the first lens zone and the second lens zone do not overlap one another on at least one side of the lens, arranged within a zone of the projection lens that is transited twice, in particular, the zone between the beam-deflection device and the concave mirror. If the "footprints" of the beam path do not overlap on at least one side of the lens, then a multigrade lens of this type will allow incorporating a pair of mutually independently acting lenses at a common location. A single lens incorporating a pair of mutually independently acting lenses, i.e., a monolithic multigrade lens, may also be fabricated from a single lens blank. Multigrade lenses of that type should be clearly distinguished from conventional doubly transited lenses, since the optical effects of multigrade lenses of that type on rays transiting their lens zones mutually independently may be mutually independently influenced by suitably independently figuring the refracting surfaces of their respective lens zones. Alternatively, a lens arrangement having one or two half-lenses or partial lenses may also be arranged at the location of the monolithic multigrade lens in order to mutually independently influence passing rays traveling in opposite directions.

In the case of preferred embodiments of projection lenses, refractive power, preferably positive refractive power, is arranged immediately following the first reflective surface and the refractive power, preferably positive refractive power, ahead of the second reflective surface is provided by a multigrade lens of that type.

Since, in the case of preferred embodiments of projection lenses, most, or all, of the positive refractive power situated between the object plane and the concave mirror may be arranged following the first reflective surface, the projection lens may be designed such that no, or only a slight amount of, refractive power is arranged between the object plane and the first reflective surface. For example, no optical components, other than a nearly plane-parallel entrance plate, might be arranged within that space. That plate may serve two purposes. Firstly, it may be employed to seal off an inner sector of the projection lens that might, if necessary, be flushed with an inert gas, for example, helium, from an outer sector flushed with some other gas, for example, nitrogen. Secondly, the imaging performance of the projection lens will be less sensitive to barometric-pressure fluctuations due to its planar interface with the ambient medium. In essence, this improvement is due to a reduced contribution from the Petzval sum, and thus to less dependence of field curvature on barometric pressure. The space between the entrance element and the first reflective surface may contain no optical components, in particular, no positive lenses, which will allow a compact design for that portion of the projection lens.

In the case of one particular embodiment, one or more aspheric surfaces may be provided in order to arrive at a good monochromatic correction and/or high imaging performance and low aberrations for very large numerical apertures, combined with low materials usages. It will be beneficial, particularly in relation to correction for spherical aberration and coma, if at least one aspherical surface is arranged in the vicinity of the plane of a stop, in which case, correction will be particularly effective if the ratio of the marginal-ray height at this aspherical surface to the radius of the aperture in the stop ranges from about 0.8 to about 1.2. The marginal-ray height at the aspherical surface should thus roughly equal the maximum marginal-ray height in the vicinity of the aperture stop.

In order to allow effectively correcting for distortion and other field aberrations, it will be beneficial if at least one aspherical surface is also provided in the near-field of a field surface. In the case of a design having at least one intermediate image, these near-fields lie in the vicinity of the object plane, in the vicinity of the image plane, and in the vicinity of the at least one intermediate image. The near-fields of these surfaces are preferably characterized by ratios of the marginal-ray height at the surface involved to the radius of the associated system stop that are less than 0.8, and preferably less than 0.6.

It will be beneficial if at least one aspherical surface is arranged in the near-field of a field surface and at least one aspherical surface is arranged in the vicinity of a system stop, which will allow adequately correcting for all of the aforementioned imaging errors.

Since projection lenses according to the invention have at least one intermediate image, they also have at least one other field plane in addition to their object plane and image plane, as well as at least one conjugate stop plane in addition to their system stop, which provides additional degrees of freedom in incorporating effective aspherical surfaces.

The previous and other properties can be seen not only in the claims but also in the description and the drawings, wherein individual characteristics may be used either alone or in sub-combinations as an embodiment of the invention and in other areas and may individually represent advantageous and patentable embodiments.

DETAILED DESCRIPTION OF THE PREFERRED EMBODIMENTS

In the following description of preferred embodiments of the invention, the term "optical axis" shall refer to a straight line or sequence of straight-line segments passing through the centers of curvature of the optical elements involved. The optical axis is folded by deflecting mirrors or other reflective surfaces. Directions and distances shall be designated as "image-end" directions or distances if they are directed toward the image plane or a substrate to be exposed situated therein, and as "object-end" directions or distances if they are directed along that segment of the optical axis extending toward the object. In the case of those examples presented here, the object involved is either a mask (reticle) bearing the pattern of an integrated circuit or some other pattern, for example, a grating pattern. In the examples presented here, the image of the object is projected onto a wafer serving as a substrate that is coated with a layer of photoresist, although other types of substrate, such as components of liquid-crystal displays or substrates for optical gratings, are also feasible.

In the following, identical or corresponding features of the various embodiments will usually be assigned the same reference numbers for greater clarity.

Figure 1:
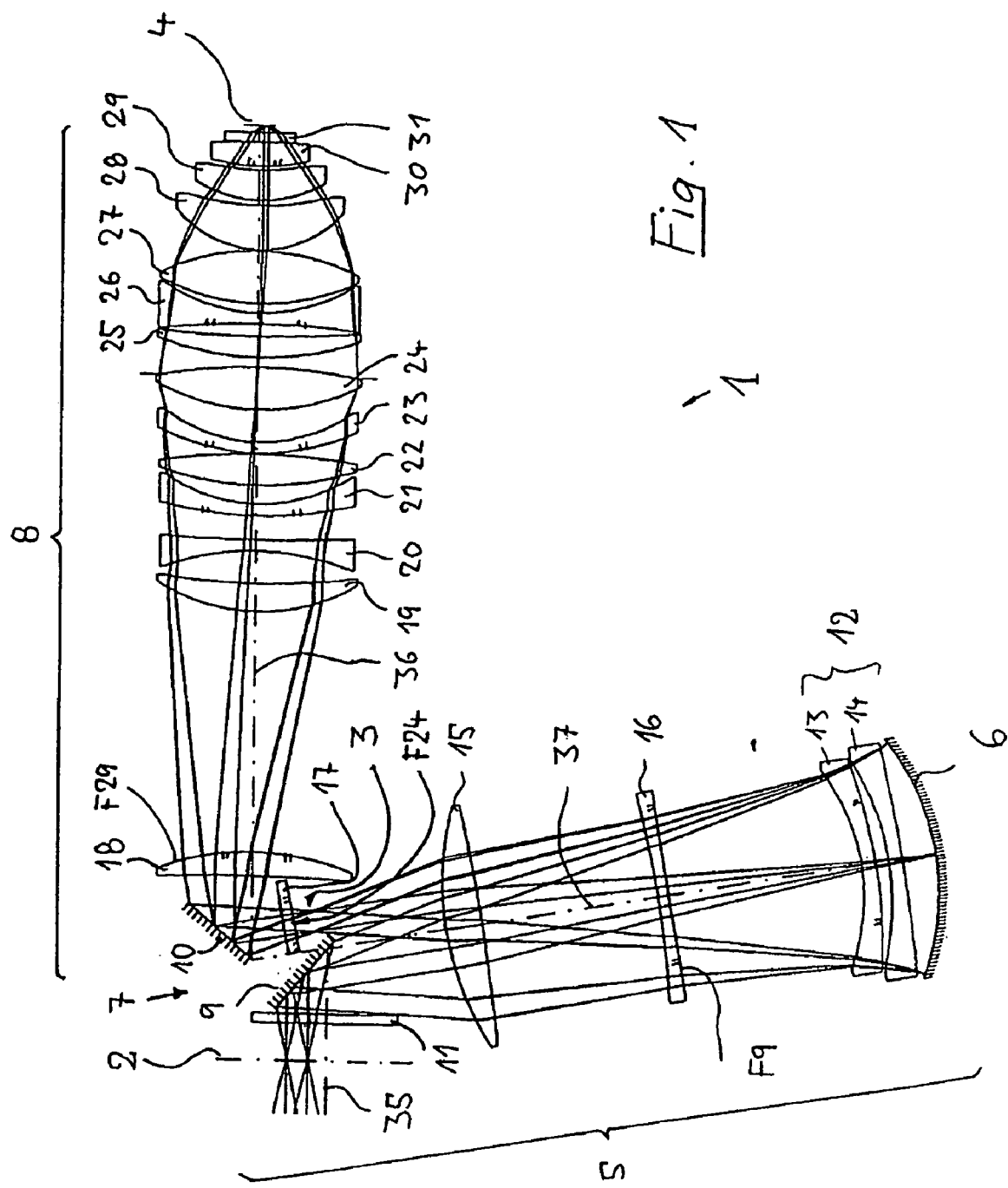
FIG. 1 is a longitudinally sectioned view of a first embodiment of a projection lens.

A typical configuration for a variation on a catadioptric reduction lens 1 according to the invention is depicted in FIG. 1, based on a first sample embodiment thereof. It serves to project an image of a pattern on a reticle or similar arranged in an object plane 2 onto an image plane 4 that is parallel to the object plane 2 on a reduced scale, for example, a scale of 4:1, while creating a single, real, intermediate image 3. The lens 1 has a catadioptric first lens section 5 between the object plane 2 and image plane 3 having a concave mirror 6 and a beam-deflection device 7 and a dioptric second lens section 8 that contains refractive optical components and a deflecting mirror 10 following the catadioptric lens section. The beam-deflection device 7 is configured in the form of a single mirror and has a first, planar, reflective surface 9 for deflecting radiation coming from the object plane 2 toward the concave mirror. A planar second reflective surface 10 arranged at a right angle to the first reflective surface deflects radiation coming from the imaging concave mirror 6 toward the image plane. Although the first reflective surface 9 is needed for deflecting radiation to the concave mirror 6, the second reflective surface 10 may be deleted, in which case, the object plane and image plane will be mutually orthogonal if no additional deflecting mirrors are employed. A folding of the optical axis may also be provided at other locations within the refractive lens section 8.

As may be seen from FIG. 1, light from an illumination system (not shown) enters the projection lens from that side of the object plane 2 that faces away from the image plane and initially passes through the mask arranged in the object plane. Light transmitted by the mask then passes through a plane parallel plate 11 arranged between the object plane 2 and the beam-deflection device 7 and is then deflected toward a mirror group 12 by the folding mirror 9 of the beam-deflection device 7. This mirror group comprises the concave mirror 6 and a pair of negative lenses 13, 14 whose surfaces facing the concave mirror 6 are all convex immediately preceding the concave mirror. The folding mirror 9 is inclined with respect to the optical axis 35 of the preceding lens section at an angle that differs from 45° such that deflection is through a deflection angle exceeding 90°, in the case of the example shown here, through a deflection angle of about 103° to 105°. Light reflected by the first folding mirror 9 transits a spherical, biconvex, positive lens 15 having a high refractive power that is transited twice whose refractive power and distance from the folding mirror 9 are chosen such that the transmitted beam is a nearly parallel beam. This lens 15 is followed by a thin, negative lens 16 situated roughly halfway between it and the mirror group 12 having a low refractive power and an aspherical surface facing the mirror group. Light transmitted by the negative lenses 13, 14 and reflected by the concave mirror 6 transits the lenses 14, 13, 16, 15, which are transited twice, and is focused, in particular, focused by the high refractive power of the positive lens 15, to form an intermediate image 3 that lies in the immediate vicinity of the first folding mirror 9, i.e., the folding mirror next to the positive lens. The lenses 17–31 of the second, entirely dioptric, lens section 8 that follow image the intermediate image 3 onto the image plane 4.

The first lens 17 of the dioptric second lens section, which is configured in the form of a half-lens and is geometrically situated between those sections of the first mirror 9 and second mirror 10 that lie close to the optical axis and optically between the intermediate image 3 and deflecting mirror 10, plays a special role. This lens 17, which is arranged outside the vicinity of the intermediate image 3, has a highly aspherical entrance surface F24 facing toward the intermediate image that is primarily employed for correcting for field aberrations. The refractive power of the lens 17 closest to the intermediate image is low to vanishingly small and may be either positive or negative, depending upon the type of design involved. Within the dioptric lens section 8, the half-lens 17 is followed by the second mirror 10, which is arranged at a right angle with respect to the first mirror 9 and provides for parallelism of the object plane 2 and image plane 4 and parallelizes the segment 35 of the optical axis close to the object and the segment 36 of the optical axis close to the image. The segment 37 of the optical axis between those two segments that belongs to the lens group 12 intersects the section of the first folding mirror 9 where the luminous intensity is greatest, and may also intersect the second folding mirror 10.

The specifications for this design are summarized in Table 1. The leftmost column thereof lists the number of the refractive, reflective, or otherwise designated surface involved, the second column thereof lists the radius, r, of that surface [mm], the third column thereof lists the distance, d [mm], between that surface and the next surface, a parameter that is referred to therein as the "thickness" of the optical element involved, the fourth column thereof lists the material employed for fabricating that optical element, and the fifth column thereof lists the refractive index of the material employed for its fabrication. The sixth column thereof lists the optically utilizable, clear, semidiameter [mm] of the optical component involved.

In the case of this particular embodiment, eight surfaces, namely surfaces F9, F19, F24, F29, F34, F38, F45, and F 53, are aspherical surfaces. Aspherical surfaces are indicated by double hatched lines in the drawing. Table 2 lists the associated data for those aspherical surfaces, from which the rise (Pfeilhöhe) of their surface figures may be computed employing the following equation:

$$p(h) = [((1/r)h^2)/(1 + SQRT(1-(1+K)(1/r)^2 h^2))] + C1 \cdot h^4 + C2 \cdot h^6 + \ldots,$$

where the reciprocal value (1/r) of the radius is the local radius of curvature of the surface in question at the surface vertex and h is the distance of a point thereon from the optical axis. The rise p(h) thus represents the distance of that point from the vertex of the surface in question, measured along the z-direction, i.e., along the optical axis. The constants K, C1, C2, etc., are listed in Table 2.

The optical system 1 that may be reproduced employing that data is designed for use at a working wavelength of about 157 nm, for which the calcium fluoride employed for fabricating all of its lenses has a refractive index, n, of 1.55841. Its image-end numerical aperture, NA, is 0.85, and its reduction ratio is 4:1. The system is designed to have an image field measuring 26 mm×5.5 mm. The system is doubly telecentric.

The operation of this optical system and several of its beneficial features will be described in detail below. Since no refractive power is situated between the object plane 2 and first folding mirror 9, the included angles between the principal ray and marginal ray and the optical axis 35 at the folding mirror 9 precisely equal the corresponding ray angles at the object plane 2. The folding of the light path by more than 90° at the first deflecting mirror 9 favors a large working distance over the entire width of the lens. The positive lens 15 arranged in the light path, following the first reflective surface 9, between the latter and the concave mirror 6, is arranged in an optical near-field of the object plane 2, within which the principal-ray height of the outermost field point of the image exceeds the marginal-ray height. The term "principal-ray height," as used here, is defined as the ray height of a ray from the edge of the field that crosses the optical axis in the vicinity of the pupil. The term "marginal-ray height," as used here, is defined as the ray height of a ray from the center of the field that proceeds to the edge of the system aperture. In combination with the vanishingly small refractive power between the object plane and first folding mirror, the positive refractive power arranged in the final third of this near-field provides that, in the case of object-end telecentricity, the principal rays of the image will be parallel to the optical axis when they strike the first reflective surface 9. Compared to designs that have positive refractive power arranged ahead of the first folding mirror 9, this design yields much lower angles of incidence for radiation incident on the first reflective surface 9. In the case of the embodiment shown, these angles of incidence will be about 68° or less, where the maximum angle of incidence involved will be about 66°. This relatively low maximum angle of incidence allows achieving a nearly uniform reflectance of the folding mirror 9 over full range of angles of incidence involved using relatively simply configured reflective coatings on the reflective surface of that folding mirror 9. Moreover, refraction by the positive lens 15 will be enhanced due to its being situated at a relatively large distance from the object plane 2 and the effects of the resultant greater marginal-ray heights on the marginal rays of the image. The diameters of the optical elements 16, 13, 14 that follow this positive lens and, in particular, the diameter of the concave mirror 6, may thus be kept small, which will simplify their fabrication and mountings and reduce the quantities of materials required for fabricating components employed in this portion of the lens.

The pair of negative meniscus lenses 13, 14 situated immediately following the concave mirror 6 correct for longitudinal chromatic aberration (LCA). The weak aspherical lens 16 also has a corrective effect.

Another special feature of this design is that positive refractive power is arranged in the light path, between the concave mirror 6 and the second reflective surface 10, close to the second reflective surface 10. This positive refractive power is also provided by the positive lens 15. The positive refractive power arranged ahead of the second folding mirror 10 approximately collimates the principal ray and thus allows keeping the diameters of the lenses of the dioptric second lens section 8 that follow it small, which allows arriving at a design that conserves materials.

The relatively high refractive power of the positive lens 15 and its distance from the mirror 9 of the beam-deflection device 7 are chosen such that the zone in which the intermediate image 3 lies, where the cross-sectional area of the propagating radiation reaches its minimum value, will coincide with that section of the first reflective surface 9 lying close to the optical axis, which will allow radiation to just miss striking the first folding mirror 9. The divergent beam on the far side of the intermediate image 3 then transits the aspherical correcting lens 17 and strikes the deflecting mirror 10 behind it, which is spatially separated from the first deflecting mirror 9 and on a separate substrate. The beneficial arrangement of the intermediate image 3 next to the first folding mirror 9 allows imaging with no vignetting, for which the pair of reflective surfaces 9, 10 may intersect the optical axes 35, 36 and for which the maximum illuminated areas on the mirrors, the so-called "footprints" involved, will overlap one another near the optical axis when viewed along the segment 37 of the optical axis. It will also be beneficial if aspherical correcting lens 17 that immediately follows the intermediate image 3 will allow making a near-field correction on the return path from the concave mirror 6. Since the intermediate image lies in the vicinity of the second folding mirror 10, the overall focal ratio of the projection lens may be minimized while holding its field dimensions constant. Due to the high degree of symmetry of the arrangement, under which the pupil lies in the vicinity of the main mirror 6, the magnification, $\beta_M$, of the catadioptric first lens section will be approximately 1, and will generally exceed about 0.95. Its magnification may also be increased to values exceeding 1 by suitably choosing the refractive power of the positive lens 15.

In the case of a version that has not been shown here, but may be derived from the embodiment shown in FIG. 1, the folding mirrors 9, 10 are also spatially separated in relation to the segment 37 of the optical axis in the manner shown there, i.e., one behind the other, with a lens arranged geometrically between them. This lens may be arranged at the approximate location of the lens 17, i.e., immediately following the intermediate image 3, between the folding mirrors 9, 10, in which case it will act only on the return path from the concave mirror 6 to the image plane 4. In this particular version, this lens has a positive refractive power and, in essence, may be used as a substitute for the effect of the positive lens 15 (cf. FIG. 1) on the way from the concave mirror 6 to the image plane 4. A positive lens that acts only on this path to the concave mirror 6 may be provided in the light path between the object plane 2 and the concave mirror 6, immediately following the folding mirror 9. This lens may be configured in the form of, for example, a half-lens that does not intrude into the light path between the concave mirror 6 and intermediate image 3. In the case of this particular design, the positive lens 15 and, if necessary, the aspherical correcting lens 16, may be deleted. The positive lens immediately following the folding mirror 9 may provide for object-end telecentricity and relatively small diameters of the components of the concave-mirror group, while the positive lens situated immediately behind the intermediate image, which is to be designed independently thereof, is able to keep ray heights at the lenses of the dioptric lens section that follow it low.

Figure 2:
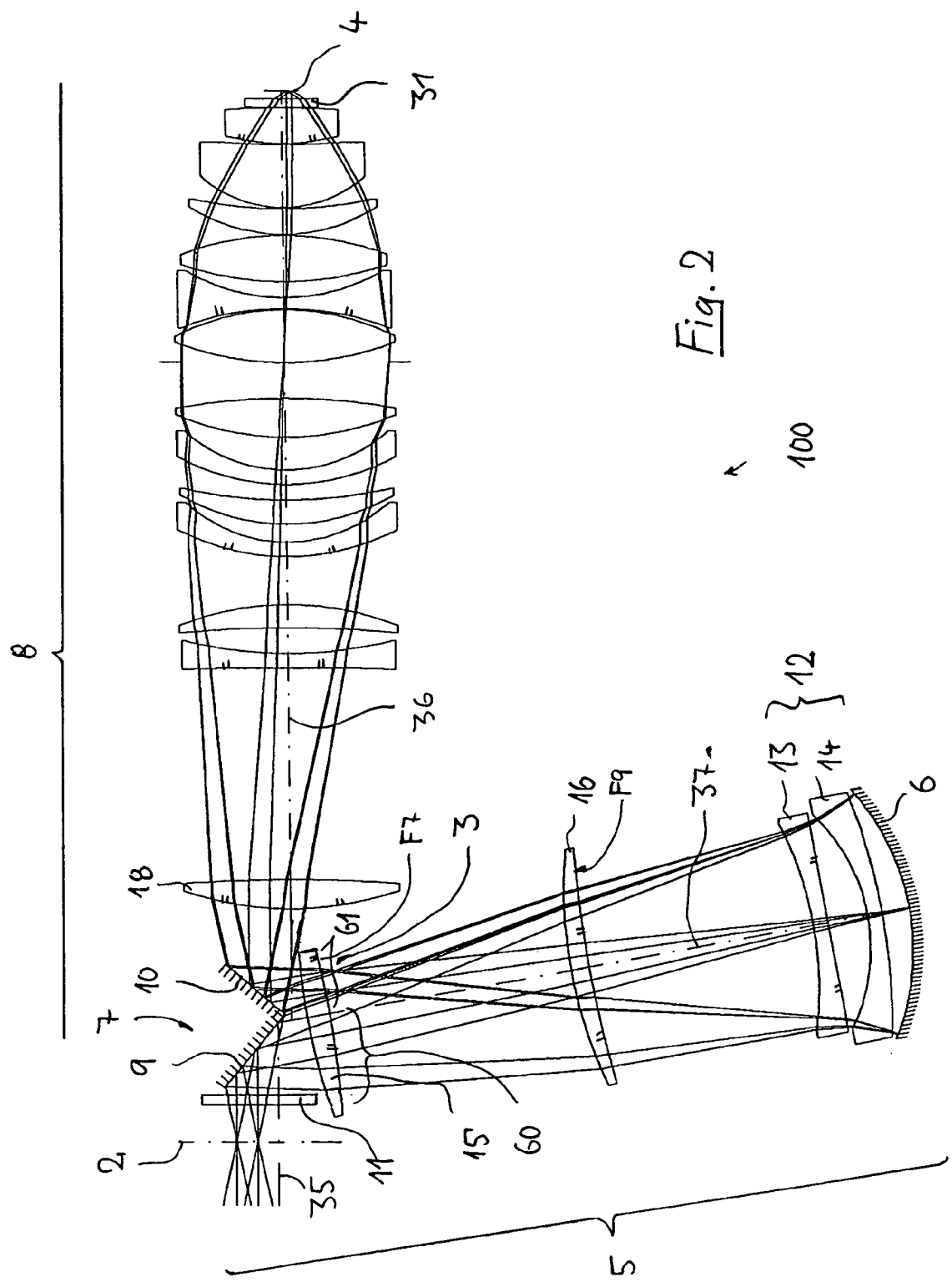
FIG. 2 is a longitudinally sectioned view of a second embodiment of a projection lens.

The specifications for an embodiment of a projection lens 100 depicted in FIG. 2 are listed in Tables 3 and 4. In the interest of clarity, the numberings of the optical elements and modules in FIG. 2 largely correspond to those employed in FIG. 1.

A conspicuous difference between the embodiment depicted in FIG. 2 and that depicted in FIG. 1 is that the first mirror 9 of the beam-deflection device 7, which is necessary for the latter's operation, and the optionally provided deflecting mirror 10 are formed on the outer surfaces of a mirrored prism, which form a right angle with one another. This benefits this component's fabrication and reliably establishes the relative positions of the mirrors 9, 10. In the case of the embodiment shown in FIG. 2, which is free of vignetting, this provides that the "footprints" of radiation incident on the first reflective surface 9 and those of radiation incident on the second reflective surface 10 will not overlap when viewed along the segment 37 of the optical axis. The segments 35, 36 of the optical axis are only slightly displaced from one another, which means, contrary to the embodiment shown in FIG. 1, that segment 36 thereof close to the image lies on the side with the concave mirror.

As in the case of the embodiment shown in FIG. 1, positive refractive power is arranged in the optical near-field of the object plane 2, between the first reflective surface 9 and the concave mirror 6. Also as in the case of the embodiment shown in FIG. 1, a lens, which, in this case, has a positive refractive power, is arranged between the intermediate image 3 and the deflecting mirror 10. A special feature of this design is that the positive refractive power provided in the immediate vicinity of the reflective surfaces 9, 10, which acts both in the light path between the first reflective surface 9 and the concave mirror and in the light path between the concave mirror and the second reflective surface 10, is provided by a single, monolithic, multigrade lens, namely, by the biconvex positive lens 15. This lens has a spherical surface facing toward the reflective surfaces 9, 10 and an aspherical surface F7 facing the concave mirror. The positive lens 15 has a first lens zone 60 that is transited by light on its way from the first folding mirror 9 to the concave mirror and a second lens zone 61 that is transited by light on its way from the concave mirror to the second reflective surface 10. These lens zones 60, 61 do not overlap one another, neither on the spherical side of the lens facing the folding mirrors 9, 10, nor on the aspherical side of the lens facing the mirror group 12, in order that these lens zone may be utilized totally independently of one another. The optical effect of these lens zones 60, 61 may thus be replaced using separate lenses, which may also be axially displaced with respect to one another, if necessary. However, combining them into a single lens simplifies the design of the projection lens.

Another special feature is that a meniscus lens 16 having a weak refractive power is provided between the folding mirrors 9, 10 and the mirror group 12. The optical surfaces of this meniscus lens 16 are curved toward the folding mirrors 9, 10, where that surface facing the folding mirrors 9, 10 is spherical and that surface facing the mirror group is aspherical. This meniscus lens 16 is situated in a central zone between the folding mirrors 9, 10 and the concave mirror 6, within which the principal-ray height is less than the marginal-ray height. However, the marginal-ray height there is at least about 70% of the marginal-ray height at the concave mirror. This lens essentially determines the magnification of the catadioptric lens section 5, which is approximately 1 and, in particular, may be slightly greater than 1. This lens also affects the correction status of the intermediate image 3.

Figure 3:
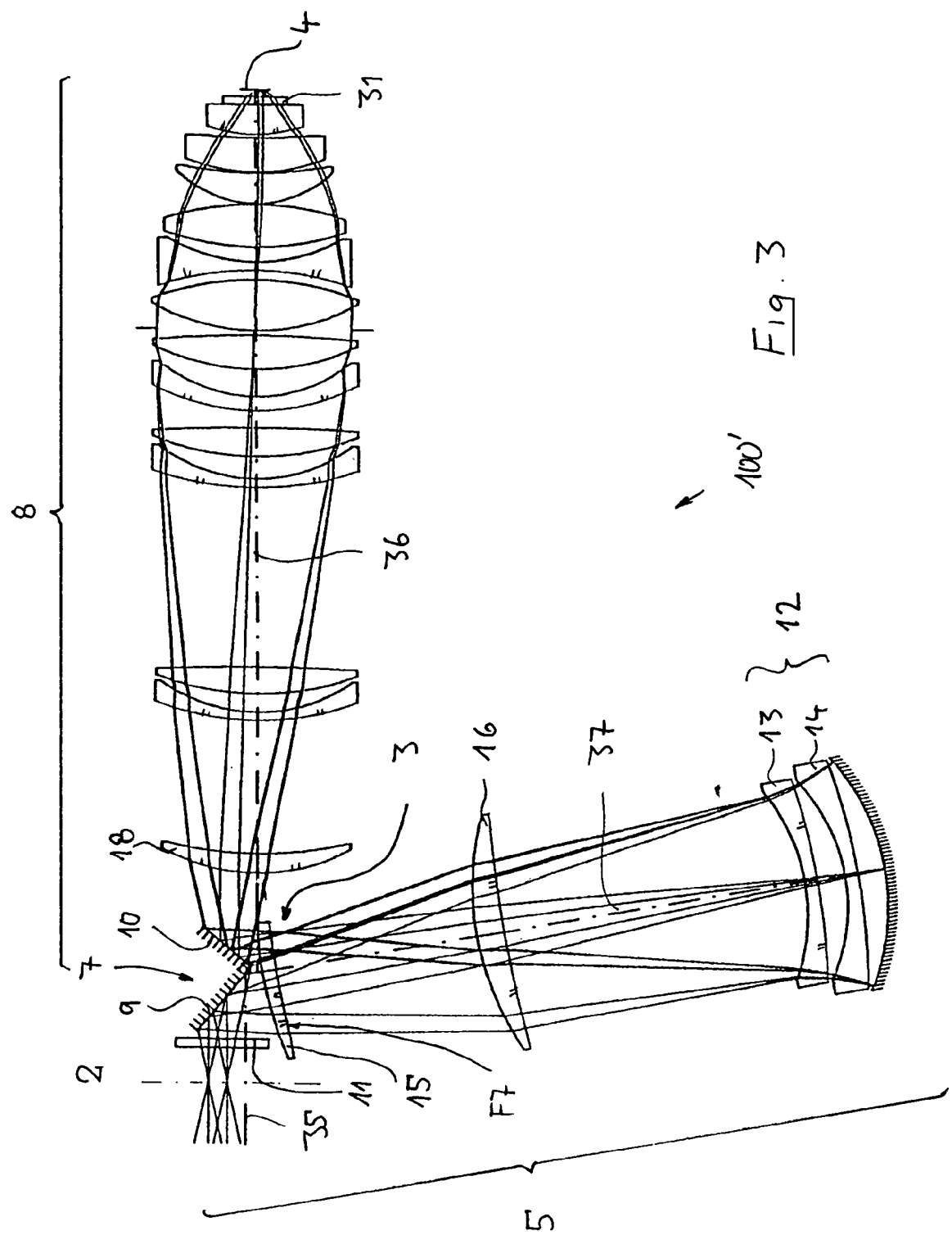
FIG. 3 is a longitudinally sectioned view of a third embodiment of a projection lens.

The specifications for an embodiment of a projection lens 100' depicted in FIG. 3 are listed in Tables 5 and 6. In view of the similarity of this embodiment to that shown in FIG. 2, the same reference numbers have been employed for identical or corresponding features.

In the case of an embodiment of a projection lens 100' shown in FIG. 3, the positive refractive power of the lens 15 near the folding mirrors 9, 10 is less than for the case of the embodiment shown in FIG. 2, while the positive refractive power of the lens 16 arranged in the central zone exceeds that for case of the embodiment shown in FIG. 2. The refractive power of this centrally arranged lens usually exceeds the refractive power of the lens 15 near the folding mirrors. This allows departing from a condition of near symmetry for the horizontal arm pointing toward the concave mirror 6 in order to achieve a magnification of approximately 1 and shift the paraxial intermediate image 3 closer to the mirror group 12 than in the case of the embodiment shown in FIG. 2. This approach will allow the marginal-ray intermediate image 3, recognizable from the collimation of the marginal rays, to fall in place well ahead of the lens closest to the folding mirrors, in spite of an overcorrection for spherical aberration of the intermediate image. In this particular configuration, correction of the overall system is much simpler than in the case of a solution having an undercorrected intermediate image.

Furthermore, the first optical element 11 may be configured in a form of a planoconcave lens, i.e., a lens having a negative refractive power, rather than a plane-parallel plate, or a transition from an object-end telecentricity to a slight divergence of the principal rays may be implemented. Either of these measures will simplify shifting the location of the paraxial intermediate image closer to the mirror group 12 in order to allow overcorrecting the intermediate image for spherical aberration.

Figure 4:
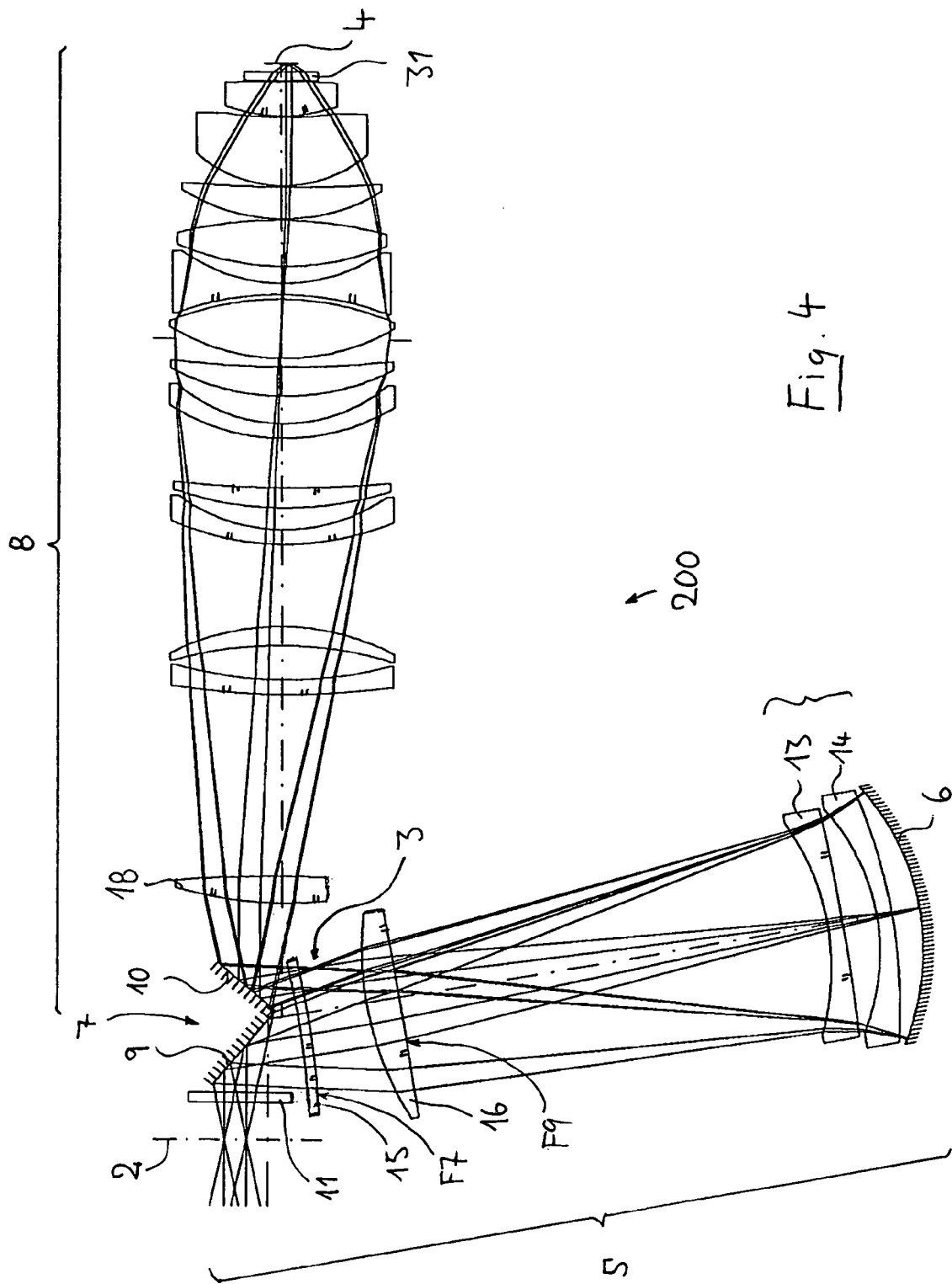
FIG. 4 is a longitudinally sectioned view of a fourth embodiment of a projection lens.
Figure 5:
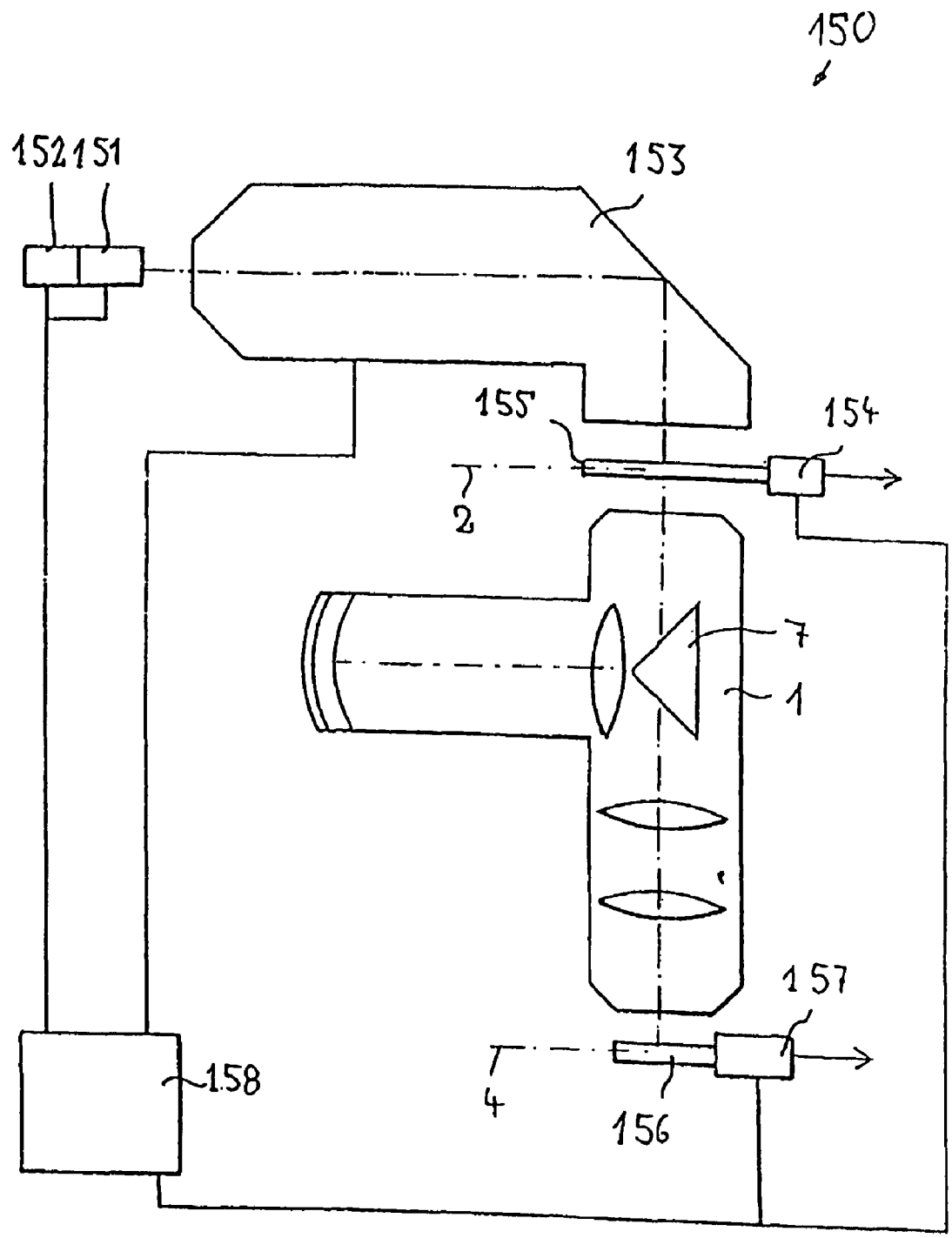
FIG. 5 is an embodiment of a microlithographic projection-exposure system according to the invention.

The specifications for the embodiment of a projection lens 200 depicted in FIG. 4 are listed in Tables 7 and 8. The numberings of the optical elements and optical modules largely correspond to the numberings employed in the case of the preceding embodiments.

As in the case of the embodiment shown in FIGS. 2 and 3, the folding mirrors 9, 10 are configured on a mirrored prism. The optical element closest to the mirrored prism is a thin lens 15 having a weak negative refractive power, a spherical surface facing the mirrored prism, and an aspherical surface F7 on its opposite side.

This thin lens 15 is a multigrade lens that is utilized in mutually independent lens zones in the light paths between the first folding mirror 9 and concave mirror and between the concave mirror and the second folding mirror 10. It provides an aspherical surface F7 following the intermediate image 3 that may be utilized for making a near-field correction, e.g., a correction for distortion.

A biconvex positive lens 16 having a spherical surface facing the mirrored prism and an aspherical surface F9 facing the concave mirror 6 is arranged a short distance behind this thin lens 15, in the vicinity of that end of the near-field lying near the object that lies opposite the object. In the case of this multigrade lens, the "footprints" of the ray bundles do not overlap one another on its spherical surface. This positive lens 16 makes a major contribution to object-end telecentricity of the projection lens and significantly influences the magnification of the catadioptric lens section on its other end, as well as the location of the intermediate image 3, which lies, freely accessible, well ahead of the thin lens 15 and may be overcorrected for spherical aberration.

In the case of all embodiments, an axial zone, within which the ray bundle running from the object field to the concave mirror 6 and the ray bundle running from the concave mirror back to the intermediate image 3 and then to the deflecting mirror 10 propagate separately from one another and do not overlap one another, lies between the folding mirrors 9, 10 and the concave mirror. This is a consequence of the employment of geometric beamsplitting, rather than the physical beamsplitting employed on other types of catadioptric projection lens. As may be seen from the sample embodiments shown in FIGS. 2 and 4, lenses or other generic types of optical elements having optically effective surfaces may be arranged within that zone that may be separately transited by two counterpropagating light beams. Employment of suitable, mutually differing, figures on those lens zones assigned to the beams will, in the case of the monolithic multigrade lenses shown, allow simulating the optical effect of a pair of independent lenses having differing curvatures. In principle, each of these beams may also be assigned to a separate lens, for example, a lens in the form of half-lenses, which may then be arranged at some other axial location.

Moreover, in the case of all embodiments, the entire intermediate image lies outside optical materials. This may be beneficial if, for example, no optical material of suitably high quality, e.g., having suitably high homogeneity, is to be used, or may be used, for fabricating the next lens because, for example, such a material is unavailable or too expensive, since it will allow precluding that any defects that may be present in the lens material will be imaged onto the image plane.

All transparent optical components of the embodiments described above are fabricated from the same material, namely, calcium fluoride. However, other materials, in particular, the crystalline fluoride materials mentioned at the outset hereof, that are transparent at the working wavelength may also be used. At least one second material may also be employed in order to, for example, assist correction for chromatic aberration, if necessary. Of course, the benefits of the invention may also be utilized in the case of systems intended for use at other wavelengths, for example, at 248 nm or 193 nm. Since just one lens material has been used in the case of the embodiments shown, adaptation of the designs shown here for use at other wavelengths will be a particularly simple matter for specialists in the field. Other lens materials, for example, synthetic quartz glass, may also be used for fabricating all, or some, optical components, particularly in the case of systems intended for use at longer wavelengths.

Projection lenses according to the invention may be employed on all suitable microlithographic projection exposure systems, for example, on a wafer stepper or a wafer scanner. FIG. 4 schematically depicts a wafer scanner 150 comprising a laser light source 151 having an associated device 152 for narrowing the bandwidth of the laser. An illumination system 153 generates a large, sharply defined, and highly homogeneous illuminated image field that is adapted to suit the telecentricity requirements of the projection lens 1 that follows. The illumination system 153 has devices for selecting the illumination mode and may, for example, be switched between conventional illumination with a variable degree of coherence, annular illumination, and dipole or quadrupole illumination. A device 154 for holding and manipulating a mask 155 is arranged following the illumination system such that the mask 155 lies in the object plane 2 of the projection lens 1 and may be translated in that plane in order to allow scanner operation. In the case of the wafer scanner shown, the device 154 thus includes the scanning drive.

The reduction lens 1, which images a pattern on the mask onto a layer of photoresist applied to a wafer 156 that is arranged in the image plane 4 of the reduction lens 1 is followed by the plane 2 of the mask. The wafer 156 is held in place by a device 157 that includes a scanning drive in order to allow translating the wafer in synchronism with the reticle. All systems are controlled by a controller 158. The layout of such systems and how they operate are well known, and will not be discussed any further here.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all changes and modifications as fall within the spirit and scope of the invention, as defined by the appended claims, and equivalents thereof.

TABLE 1

| SURFACE NO. | RADIUS [mm] | THICKNESS [mm] | MATERIAL | REFRACTIVE INDEX AT 157.63 nm | CLEAR SEMI-DIAMETER [MM] |
|---|---|---|---|---|---|
| 0 | 0.000000000 | 38.000000000 |  | 1.00000000 | 67.000 |
| 1 | 0.000000000 | 0.000000000 |  | 1.00000000 | 73.600 |
| 2 | 0.000000000 | 10.000000000 | CAF2NL | 1.55840983 | 73.600 |
| 3 | 0.000000000 | 70.000000000 |  | 1.00000000 | 74.732 |
| 4 REFL | 0.000000000 | 0.000000000 |  | −1.00000000 | 97.881 |
| 5 | 0.000000000 | −133.311965036 |  | −1.00000000 | 87.714 |
| 6 | −307.940299125 | −40.010654384 | CAF2HL | −1.55840983 | 118.818 |
| 7 | 2164.406690397 | −195.915749648 |  | −1.00000000 | 118.459 |
| 8 | 1145.772727578 | −12.000000000 | CAF2HL | −1.55840983 | 105.085 |
| 9 | 41542.654738590AS | −215.304123546 |  | −1.00000000 | 104.971 |
| 10 | 214.512035930 | −15.000000000 | CAF2HL | −1.55840983 | 106.354 |
| 11 | 638.575655074AS | −14.540214990 |  | −1.00000000 | 112.985 |
| 12 | 290.361263174 | −15.000000000 | CAF2HL | −1.55840983 | 113.567 |
| 13 | 1670.477347880 | −36.475841937 |  | −1.00000000 | 123.399 |
| 14 REFL | 263.711286197 | 36.475841937 |  | 1.00000000 | 127.277 |
| 15 | 1670.477347880 | 15.000000000 | CAF2HL | 1.55840983 | 122.138 |
| 16 | 290.361263174 | 14.540214990 |  | 1.00000000 | 111.532 |
| 17 | 638.575655074AS | 15.000000000 | CAF2HL | 1.55840983 | 110.735 |

TABLE 1-continued

| SURFACE NO. | RADIUS [mm] | THICKNESS [mm] | MATERIAL | REFRACTIVE INDEX AT 157.63 nm | CLEAR SEMI-DIAMETER [MM] |
|---|---|---|---|---|---|
| 18 | 214.512035930 | 215.304123546 |  | 1.00000000 | 103.542 |
| 19 | 41542.654738590AS | 12.000000000 | CAF2HL | 1.55840983 | 92.197 |
| 20 | 1145.772727578 | 195.915749648 |  | 1.00000000 | 91.744 |
| 21 | 2164.406690397 | 40.010654384 | CAF2HL | 1.55840983 | 93.953 |
| 22 | −307.940299125 | 93.502628230 |  | 1.00000000 | 93.916 |
| 23 | 0.000000000 | 69.612797634 |  | 1.00000000 | 74.016 |
| 24 | 1152.329519196AS | 12.000000000 | CAF2HL | 1.55840983 | 72.572 |
| 25 | 37135.535790532 | 40.000000000 |  | 1.00000000 | 73.650 |
| 26 REFL | 0.000000000 | 0.000000000 |  | −1.00000000 | 104.242 |
| 27 | 0.000000000 | −89.999998581 |  | −1.00000000 | 80.402 |
| 28 | 2156.183282825 | −25.386985155 | CAF2HL | −1.55840983 | 96.092 |
| 29 | 310.094832031AS | −259.976714689 |  | −1.00000000 | 97.533 |
| 30 | −205.073062207 | −30.903153505 | CAF2HL | −1.55840983 | 102.144 |
| 31 | −737.012672355 | −35.657520149 |  | −1.00000000 | 100.226 |
| 32 | 277.616131847 | −12.000000000 | CAF2HL | −1.55840983 | 97.950 |
| 33 | −1658.836653991 | −26.500800278 |  | −1.00000000 | 98.325 |
| 34 | −389.548253377AS | −13.000000000 | CAF2HL | −1.55840983 | 100.230 |
| 35 | −178.427332142 | −20.336884736 |  | −1.00000000 | 98.841 |
| 36 | −330.383013064 | −34.100704348 | CAF2HL | −1.55840983 | 101.168 |
| 37 | 636.434463774 | −1.042691066 |  | −1.00000000 | 102.114 |
| 38 | −231.491669033AS | −12.000000000 | CAF2HL | −1.55840983 | 104.017 |
| 39 | −171.208627680 | −35.085018746 |  | −1.00000000 | 101.347 |
| 40 | −237.352516070 | −46.296854768 | CAF2HL | −1.55840983 | 108.187 |
| 41 | 525.594192625 | 10.471286228 |  | −1.00000000 | 107.838 |
| 42 | 0.000000000 | −20.471277660 |  | −1.00000000 | 107.720 |
| 43 | −320.605779390 | −22.831866975 | CAF2HL | −1.55840983 | 106.465 |
| 44 | −1241.212850974 | −13.263059881 |  | −1.00000000 | 105.155 |
| 45 | 950.168279048AS | −12.000000000 | CAF2HL | −1.55840983 | 104.769 |
| 46 | −188.793788660 | −10.065462837 |  | −1.00000000 | 101.879 |
| 47 | −242.760094815 | −56.464342346 | CAF2HL | −1.55840983 | 102.828 |
| 48 | 239.204740180 | −1.003339064 |  | −1.00000000 | 102.908 |
| 49 | −116.944314609 | −48.054288185 | CAF2HL | −1.55840983 | 85.590 |
| 50 | −284.614493009 | −5.524166600 |  | −1.00000000 | 74.774 |
| 51 | −132.301445843 | −32.584430855 | CAF2HL | −1.55840983 | 65.812 |
| 52 | −255.196011037 | −4.127263055 |  | −1.00000000 | 52.652 |
| 53 | −196.624047651AS | −25.756004138 | CAF2HL | −1.56840983 | 48.450 |
| 54 | 4472.857045451 | −0.999991279 |  | −1.00000000 | 35.916 |
| 55 | 0.000000000 | −10.000000000 | CAF2HL | −1.55840983 | 34.140 |
| 56 | 0.000000000 | −7.999714605 |  | −1.00000000 | 28.017 |
| 57 | 0.000000000 | −0.000285920 |  | −1.00000000 | 16.750 |

TABLE 2

ASPHERICITY CONSTANTS

SURFACE NO. 9

| K | 0.0000 |
|---|---|
| C1 | −5.35990725E−009 |
| C2 | 8.44322708E−014 |
| C3 | 2.04970926e−018 |
| C4 | −2.00002983E−022 |
| C5 | −8.61860605E−029 |

SURFACE NO. 11

| K | 0.0000 |
|---|---|
| C1 | 1.06206195e−008 |
| C2 | −1.66814986e−013 |
| C3 | 2.07846430e−018 |
| C4 | 9.38453692e−024 |
| C5 | −7.34445600e−027 |

SURFACE NO. 17

| K | 0.0000 |
|---|---|
| C1 | 1.06206195e−008 |
| C2 | −1.66814986e−013 |
| C3 | 2.07846430e−018 |
| C4 | 9.38453692e−024 |
| C5 | −7.34445600e−027 |

TABLE 2-continued

ASPHERICITY CONSTANTS

SURFACE NO. 19

| K | 0.0000 |
|---|---|
| C1 | −5.35990725e−009 |
| C2 | 8.44322708e−014 |
| C3 | 2.04970926e−018 |
| C4 | −2.00002983e−022 |
| C5 | −8.61860605e−029 |

SURFACE NO. 24

| K | 0.0000 |
|---|---|
| C1 | −2.09703881e−008 |
| C2 | −3.00964102e−013 |
| C3 | −7.85956301e−018 |
| C4 | 3.77534210e−022 |
| C5 | −4.16803411e−026 |

SURFACE NO. 29

| K | 0.0000 |
|---|---|
| C1 | 1.01304008e−005 |
| C2 | 5.60248230e−014 |
| C3 | −2.35953956e−019 |
| C4 | 6.44001150e−023 |
| C5 | −1.13567886e−027 |

TABLE 2-continued

ASPHERICITY CONSTANTS

SURFACE NO. 34

| | |
|---|---|
| K | 0.0000 |
| C1 | 1.84766728E-008 |
| C2 | -7.50327625E-013 |
| C3 | 1.51307426e-017 |
| C4 | -3.31183639e-022 |
| C5 | 3.78632903E-026 |

SURFACE NO. 38

| | |
|---|---|
| K | 0.0000 |
| C1 | 9.32700652e-009 |
| C2 | 2.90350425e-013 |
| C3 | -4.63037140e-019 |
| C4 | -8.96846736e-023 |
| C5 | -5.17089383e-026 |

TABLE 2-continued

ASPHERICITY CONSTANTS

SURFACE NO. 45

| | |
|---|---|
| K | 0.0000 |
| C1 | 1.02561382e-008 |
| C2 | -5.37511892e-013 |
| C3 | 3.06057844e-017 |
| C4 | -1.37956720e-021 |
| C5 | 4.83355612e-026 |

SURFACE NO. 53

| | |
|---|---|
| K | 0.0000 |
| C1 | 7.54615362e-008 |
| C2 | 9.85610968e-012 |
| C3 | 1.28822999e-015 |
| C4 | 2.55342679e-019 |
| C5 | 3.58082167e-024 |

TABLE 3

| SURFACE NO. | RADIUS [mm] | THICKNESS [mm] | MATERIAL | REFRACTIVE INDEX AT 157.63 nm | CLEAR SEMI-DIAMETER [MM] |
|---|---|---|---|---|---|
| 0 | 0.000000000 | 38.000000000 | | 1.00000000 | 68.001 |
| 1 | 0.000000000 | 0.000000000 | | 1.00000000 | 74.499 |
| 2 | 0.000000000 | 10.000000000 | CAF2HL | 1.55840983 | 74.499 |
| 3 | 0.000000000 | 75.000000000 | | 1.00000000 | 75.615 |
| 4 | 0.000000000 | 0.000000000 | | -1.00000000 | 100.655 |
| REFL | | | | | |
| 5 | 0.000000000 | -30.000000000 | | -1.00000000 | 89.383 |
| 6 | -641.307720220 | -23.416007239 | CAF2HL | -1.55840983 | 96.523 |
| 7 | 1000.000000000AS | -250.303777031 | | -1.00000000 | 97.277 |
| 8 | -453.391899200 | -19.343368806 | CAF2HL | -1.55840983 | 113.614 |
| 9 | -1053.862012320AS | -236.097494268 | | -1.00000000 | 113.117 |
| 10 | 364.590613387 | -15.000000000 | CAF2HL | -1.55840983 | 107.750 |
| 11 | -3544.104192730AS | -41.574651954 | | -1.00000000 | 110.974 |
| 12 | 191.741221431 | -15.000000000 | CAF2HL | -1.55840983 | 111.790 |
| 13 | 670.394926894 | -28.663186491 | | -1.00000000 | 125.117 |
| 14 | 249.190705946 | 28.663186491 | | 1.00000000 | 127.519 |
| REFL | | | | | |
| 15 | 670.394926894 | 15.000000000 | CAF2HL | 1.55840983 | 123.654 |
| 16 | 191.741221431 | 41.574651954 | | 1.00000000 | 108.138 |
| 17 | -3544.104192730AS | 15.000000000 | CAF2HL | 1.55840983 | 106.320 |
| 18 | 364.590613387 | 236.097494268 | | 1.00000000 | 101.852 |
| 19 | -1053.862012320AS | 19.343368806 | CAF2HL | 1.55840983 | 88.617 |
| 20 | -453.391899200 | 228.719702096 | | 1.00000000 | 88.557 |
| 21 | 0.000000000 | 21.584074291 | | 1.00000000 | 65.033 |
| 22 | 1000.000000000AS | 23.416007239 | CAF2HL | 1.55840983 | 70.712 |
| 23 | -641.307720220 | 16.000000000 | | 1.00000000 | 73.279 |
| 24 | 0.000000000 | 0.000000000 | | -1.00000000 | 100.812 |
| REFL | | | | | |
| 25 | 0.000000000 | -115.000000000 | | -1.00000000 | 76.883 |
| 26 | -335.357779463AS | -30.056610339 | CAF2HL | -1.55840983 | 101.678 |
| 27 | 1510.810970940 | -219.517838323 | | -1.00000000 | 101.852 |
| 28 | 12324.258313600AS | -15.000000000 | CAF2HL | -1.55840983 | 100.831 |
| 29 | -447.264669445 | -26.756265976 | | -1.00000000 | 101.391 |
| 30 | 1126.485268210 | -24.190199191 | CAF2HL | -1.55840983 | 103.143 |
| 31 | 301.609222325 | -49.713440592 | | -1.00000000 | 104.587 |
| 32 | -241.897275411AS | -15.000000000 | CAF2HL | -1.55840983 | 106.463 |
| 33 | -154.971453131 | -18.567453547 | | -1.00000000 | 102.267 |
| 34 | -217.571765793 | -25.078509644 | CAF2HL | -1.55840983 | 104.373 |
| 35 | -490.271893570 | -16.150668927 | | -1.00000000 | 104.176 |
| 36 | -228.235468727AS | -15.000000000 | CAF2HL | -1.55840983 | 107.032 |

TABLE 3-continued

| SURFACE NO. | RADIUS [mm] | THICKNESS [mm] | MATERIAL | REFRACTIVE INDEX AT 157.63 nm | CLEAR SEMI-DIAMETER [MM] |
|---|---|---|---|---|---|
| 37 | −157.055700171 | −34.035069427 |  | −1.00000000 | 103.217 |
| 38 | −287.052154548 | −40.519579185 | CAF2HL | −1.55840983 | 108.666 |
| 39 | 631.207895248 | −37.679553832 |  | −1.00000000 | 109.045 |
| 40 | 0.000000000 | 0.355249183 |  | −1.00000000 | 107.397 |
| 41 | −313.083432913 | −55.043917213 | CAF2HL | −1.55840983 | 109.604 |
| 42 | 249.425449760 | −1.300000000 |  | −1.00000000 | 108.976 |
| 43 | 316.623332680AS | −11.520989587 | CAF2HL | −1.55840983 | 105.947 |
| 44 | −201.075131179 | −16.566037659 |  | −1.00000000 | 100.387 |
| 45 | −335.828208689 | −47.396334412 | CAF2HL | −1.55840983 | 101.385 |
| 46 | 301.868735231 | −1.300000000 |  | −1.00000000 | 101.380 |
| 47 | −178.999700145 | −26.411511799 | CAF2HL | −1.55840983 | 92.032 |
| 48 | −435.182342636 | −1.300000000 |  | −1.00000000 | 88.607 |
| 49 | −128.675749447 | −64.698491654 | CAF2HL | −1.55840983 | 80.149 |
| 50 | −742.665306379 | −1.300000000 |  | −1.00000000 | 58.986 |
| 51 | −194.434646004AS | −36.855908913 | CAF2HL | −1.55840983 | 53.710 |
| 52 | 1041.239464220 | −0.968000000 |  | −1.00000000 | 35.905 |
| 53 | 0.000000000 | −8.900000000 | CAF2HL | −1.55840983 | 33.484 |
| 54 | 0.000000000 | −7.999827959 |  | −1.00000000 | 28.083 |
| 55 | 0.000000000 | −0.000172002 |  | −1.00000000 | 17.001 |

TABLE 4

ASPHERICITY CONSTANTS

SURFACE NO. 7

| K | 0.0000 |
| C1 | −2.41431821e−009 |
| C2 | 8.72010493e−014 |
| C3 | 4.83922684e−018 |
| C4 | −4.02746054e−022 |
| C5 | 1.63273036e−026 |

SURFACE NO. 9

| K | 0.0000 |
| C1 | 2.14120800e−009 |
| C2 | 6.35804790e−014 |
| C3 | 1.49738768e−017 |
| C4 | −6.91341248e−022 |
| C5 | 1.01443213e−026 |

SURFACE NO. 11

| K | 0.0000 |
| C1 | 1.32760010e−008 |
| C2 | −3.82914189e−013 |
| C3 | 6.57032937e−018 |
| C4 | 8.90502658e−023 |
| C5 | −1.03184938e−026 |

SURFACE NO. 17

| K | 0.0000 |
| C1 | 1.32760010e−008 |
| C2 | −3.82914189e−013 |
| C3 | 6.57032937e−018 |
| C4 | 8.90502658e−023 |
| C5 | −1.03184938e−026 |

SURFACE NO. 19

| K | 0.0000 |
| C1 | 2.14120800e−009 |
| C2 | 6.35804790e−014 |
| C3 | 1.49738768e−017 |
| C4 | −6.91341248e−022 |
| C5 | 1.01443213e−026 |

SURFACE NO. 22

| K | 0.0000 |
| C1 | −2.41431821e−009 |
| C2 | 8.72010493e−014 |
| C3 | 4.83922684e−018 |
| C4 | −4.02746054e−022 |
| C5 | 1.63273036e−026 |

TABLE 4-continued

ASPHERICITY CONSTANTS

SURFACE NO. 26

| K | 0.0000 |
| C1 | 3.95447304e−009 |
| C2 | 9.09438325e−014 |
| C3 | 4.22511642e−018 |
| C4 | −2.93972619e−022 |
| C5 | 1.09225112e−026 |

SURFACE NO. 28

| K | 0.0000 |
| C1 | 8.77986844e−009 |
| C2 | −9.07358887e−015 |
| C3 | 2.28596820e−017 |
| C4 | −2.14520017e−021 |
| C5 | 4.40304031e−026 |

SURFACE NO. 32

| K | 0.0000 |
| C1 | −1.89598089e−009 |
| C2 | 3.59150394e−013 |
| C3 | −1.19240218e−017 |
| C4 | 1.76180159e−021 |
| C5 | 1.53735586e−026 |

SURFACE NO. 36

| K | 0.0000 |
| C1 | 1.93916074e−008 |
| C2 | −7.79037734e−013 |
| C3 | −4.21634732e−018 |
| C4 | −9.87288145e−022 |
| C5 | −1.16039792e−025 |

SURFACE NO. 43

| K | 0.0000 |
| C1 | 1.72770997e−008 |
| C2 | −1.19193173e−012 |
| C3 | 8.57533596e−017 |
| C4 | −3.85173452e−021 |
| C5 | 1.04294762e−025 |

TABLE 4-continued

ASPHERICITY CONSTANTS

SURFACE NO. 51

| | |
|---|---|
| K | 0.0000 |
| C1 | 1.01869239e−007 |
| C2 | 4.35918644e−013 |
| C3 | 2.40039401e−015 |
| C4 | −3.61654771e−019 |
| C5 | 1.44807179e−023 |

TABLE 5

| SURFACE NO. | RADIUS [mm] | THICKNESS [mm] | MATERIAL | REFRACTIVE INDEX AT 157.63 nm | CLEAR SEMI. DIAMETER [mm] |
|---|---|---|---|---|---|
| 0 | 0.000000000 | 38.000000000 | | | 67.000 |
| 1 | 0.000000000 | 0.000000000 | | | 75.225 |
| 2 | 0.000000000 | 10.000000000 | CAF2HL | 1.55840983 | 75.225 |
| 3 | 5026.710952835 | 75.000000000 | | | 76.676 |
| 4 | 0.000000000 | 0.000000000 | | | 93.476 |
| 5 | 0.000000000 | 20.000000000 | | | 93.476 |
| 6 | 439.905693862 | 16.659146566 | CAF2HL | 1.55840983 | 100.625 |
| 7 | 1227.077239621 AS | 235.597223752 | | | 101.112 |
| 8 | 332.609004891 | 31.053281395 | CAF2HL | 1.55840983 | 134.454 |
| 9 | 1364.837845865 AS | 348.426916458 | | | 133.749 |
| 10 | −229.186806761 | 15.000000000 | CAF2HL | 1.55840983 | 111.190 |
| 11 | −887.413575492 AS | 31.263638980 | | | 116.830 |
| 12 | −216.344731322 | 15.000000000 | CAF2HL | 1.55840983 | 117.718 |
| 13 | −790.516839756 | 30.670238662 | | | 131.197 |
| 14 | 0.000000000 REFL | 0.000000000 | | | 152.343 |
| 15 | 263.712437622 REFL | 30.670238662 | | | 133.695 |
| 16 | 790.516839756 | 15.000000000 | CAF2HL | 1.55840983 | 130.120 |
| 17 | 216.344731322 | 31.263638980 | | | 113.456 |
| 18 | 887.413575492 AS | 15.0000000 | CAF2HL | 1.55840983 | 111.521 |
| 19 | 229.186806761 | 348.426916458 | | | 105.324 |
| 20 | −1364.837845865 AS | 31.053281395 | CAF2HL | 1.55840983 | 100.842 |
| 21 | −332.609004891 | 189.538500863 | | | 101.163 |
| 22 | 0.000000000 | 46.058722888 | | | 68.780 |
| 23 | −1227.077239621 AS | 16.659146566 | CAF2HL | 1.55840983 | 70.243 |
| 24 | −439.905693862 | 6.000000000 | | | 72.720 |
| 25 | 0.000000000 | 0.000000000 | | | 75.287 |
| 26 | 0.000000000 | 115.000000000 | | | 75.287 |
| 27 | 212.662385283 AS | 22.778170611 | CAF2HL | 1.55840983 | 105.456 |
| 28 | 432.949306418 | 155.243195640 | | | 104.939 |
| 29 | 318.114733079 AS | 10.050000000 | CAF2HL | 1.55840983 | 113.134 |
| 30 | 191.852799771 | 21.217161109 | | | 110.633 |
| 31 | 331.301477346 | 31.570249605 | CAF2HL | 1.55840983 | 112.114 |
| 32 | −2124.025016182 | 207.873414147 | | | 112.353 |
| 33 | 395.650873441 AS | 10.050000000 | CAF2HL | 1.55840983 | 115.001 |
| 34 | 184.084319968 | 25.339352066 | | | 111.612 |
| 35 | 319.412585638 | 33.132340364 | CAF2HL | 1.55840983 | 114.062 |
| 36 | −2163.174178952 | 19.127133631 | | | 114.314 |
| 37 | 243.323520750 AS | 16.805254980 | CAF2HL | 1.55840983 | 115.001 |
| 38 | 173.493891489 | 31.644469974 | | | 110.289 |
| 39 | 274.550369516 | 39.001812657 | CAF2HL | 1.55840983 | 113.930 |
| 40 | −1244.464415898 | 6.691446193 | | | 113.620 |
| 41 | 0.000000000 | −1.172094906 | | | 112.367 |
| 42 | 246.065124291 | 57.874649366 | CAF2HL | 1.55840983 | 115.001 |
| 43 | −333.215496480 | 10.324475387 | | | 113.826 |
| 44 | −383.834755700 AS | 10.054453042 | CAF2HL | 1.55840983 | 107.567 |
| 45 | 204.094348018 | 17.053820466 | | | 100.354 |
| 46 | 336.356939295 | 48.122339665 | CAF2HL | 1.55840983 | 100.994 |
| 47 | −337.425785903 | 1.300000000 | | | 100.164 |
| 48 | 130.740070948 | 34.419792171 | CAF2HL | 1.55840983 | 86.933 |
| 49 | 447.199083795 | 1.300000000 | | | 82.733 |
| 50 | 215.538969564 | 39.296931919 | CAF2HL | 1.55840983 | 77.502 |
| 51 | 623.875242709 | 3.898956916 | | | 62.110 |
| 52 | 160.560409320 AS | 33.993438695 | CAF2HL | 1.55840983 | 53.256 |
| 53 | 2605.444962161 | 0.968000000 | | | 36.345 |
| 54 | 0.000000000 | 8.900000000 | CAF2HL | 1.55840983 | 35.210 |
| 55 | 0.000000000 | 7.999812087 | | | 29.455 |
| 56 | 0.000000000 | 0.000188006 | | | 16.750 |

TABLE 6

ASPHERICITY CONSTANTS

SURFACE NO. 7

| | |
|---|---|
| K | 0.0000 |
| C1 | −8.50480567e−010 |
| C2 | −8.98169429e−015 |
| C3 | −3.37190756e−018 |
| C4 | 2.82915328e−022 |
| C5 | −1.33135574e−026 |

SURFACE NO. 9

| | |
|---|---|
| K | 0.0000 |
| C1 | 3.75825637e−010 |
| C2 | −4.71635546e−014 |
| C3 | −9.60977050e−019 |
| C4 | 4.45399898e−023 |
| C5 | −5.78346662e−028 |

SURFACE NO. 11

| | |
|---|---|
| K | 0.0000 |
| C1 | −6.40869565e−009 |
| C2 | 1.22587415e−013 |
| C3 | −6.09118908e−019 |
| C4 | −7.01223838e−023 |
| C5 | 6.87334245e−027 |

SURFACE NO. 18

| | |
|---|---|
| K | 0.0000 |
| C1 | 6.40869565e−009 |
| C2 | −1.22587415e−013 |
| C3 | 6.09118908e−019 |
| C4 | 7.01223838e−023 |
| C5 | −6.87334245e−027 |

SURFACE NO. 20

| | |
|---|---|
| K | 0.0000 |
| C1 | −3.75825637e−010 |
| C2 | 4.71635546e−014 |
| C3 | 9.60977050e−019 |
| C4 | −4.45399898e−023 |
| C5 | 5.78346662e−028 |

SURFACE NO. 23

| | |
|---|---|
| K | 0.0000 |
| C1 | 8.50480567e−010 |
| C2 | 8.98169429e−015 |
| C3 | 3.37190756e−018 |
| C4 | −2.82915328e−022 |
| C5 | 1.33135574e−026 |

SURFACE NO. 27

| | |
|---|---|
| K | 0.0000 |
| C1 | −9.23427232e−009 |
| C2 | −1.07124765e−013 |
| C3 | −4.81193386e−018 |

TABLE 6-continued

ASPHERICITY CONSTANTS

| | |
|---|---|
| C4 | 1.77351539e−022 |
| C5 | −9.82371797e−026 |

SURFACE NO. 29

| | |
|---|---|
| K | 0.0000 |
| C1 | −1.56983387e−009 |
| C2 | 2.14062391e−014 |
| C3 | −8.09568422e−020 |
| C4 | 8.86706024e−023 |
| C5 | 2.56167279e−027 |

SURFACE NO. 33

| | |
|---|---|
| K | 0.0000 |
| C1 | 2.41774338e−010 |
| C2 | 3.87939578e−013 |
| C3 | −3.42721958e−018 |
| C4 | 1.05836179e−022 |
| C5 | −1.25053872e−026 |

SURFACE NO. 37

| | |
|---|---|
| K | 0.0000 |
| C1 | −7.63364548e−009 |
| C2 | −1.34366755e−013 |
| C3 | 2.83778485e−018 |
| C4 | −1.47596012e−022 |
| C5 | 2.94427311e−026 |

SURFACE NO. 44

| | |
|---|---|
| K | 0.0000 |
| C1 | −2.34852800e−008 |
| C2 | 1.31892355e−012 |
| C3 | −5.26131762e−017 |
| C4 | 1.63444406e−021 |
| C5 | −4.26830917e−026 |

SURFACE NO. 52

| | |
|---|---|
| K | 0.0000 |
| C1 | −2.52923104e−008 |
| C2 | −9.72529301e−012 |
| C3 | −1.44043053e−015 |
| C4 | −7.33261592e−020 |
| C5 | 2.47852205e−024 |

TABLE 7

| SURFACE NO. | RADIUS [mm] | THICKNESS [mm] | MATERIAL | REFRACTIVE INDEX AT 157.63 nm | CLEAR SEMI-DIAMETER [MM] |
|---|---|---|---|---|---|
| 0 | 0.000000000 | 38.000000000 | | 1.00000000 | 68.001 |
| 1 | 0.000000000 | 0.000000000 | | 1.00000000 | 74.497 |
| 2 | 0.000000000 | 10.000000000 | CAF2HL | 1.55840983 | 74.497 |
| 3 | 0.000000000 | 75.000000000 | | 1.00000000 | 75.612 |
| 4 | 0.000000000 | 0.000000000 | | −1.00000000 | 100.651 |
| REFL | | | | | |
| 5 | 0.000000000 | −30.000000000 | | −1.00000000 | 89.374 |
| 6 | 879.406688064 | −10.050000000 | CAF2HL | −1.55040983 | 94.130 |
| 7 | 1000.000000000AS | −59.850818837 | | −1.00000000 | 95.771 |
| 8 | −319.617400328 | −33.615258304 | CAF2HL | −1.55840983 | 112.385 |
| 9 | 2809.766357310AS | −438.648649357 | | −1.00000000 | 112.205 |
| 10 | 260.166519217 | −15.000000000 | CAF2HL | −1.55840983 | 107.091 |
| 11 | 6721.419871440AS | −35.297487665 | | −1.00000000 | 112.822 |

TABLE 7-continued

| SURFACE NO. | RADIUS [mm] | THICKNESS [mm] | MATERIAL | REFRACTIVE INDEX AT 157.63 nm | CLEAR SEMI-DIAMETER [MM] |
|---|---|---|---|---|---|
| 12 | 218.405156771 | −15.000000000 | CAF2HL | −1.55840983 | 114.051 |
| 13 | 574.007782678 | −28.334455790 | | −1.00000000 | 125.783 |
| 14 REFL | 253.979438343 | 28.334455790 | | 1.00000000 | 128.878 |
| 15 | 574.007782678 | 15.000000000 | CAF2HL | 1.55840983 | 123.724 |
| 16 | 218.405156771 | 35.297487665 | | 1.00000000 | 110.075 |
| 17 | 6721.419871440AS | 15.000000000 | CAF2HL | 1.55840983 | 107.848 |
| 18 | 260.166519217 | 438.648649357 | | 1.00000000 | 101.112 |
| 19 | 2809.766357310AS | 33.615258304 | CAF2HL | 1.55840983 | 76.746 |
| 20 | −319.617400328 | 29.999999996 | | 1.00000000 | 76.271 |
| 21 | 0.000000000 | 29.850818837 | | 1.00000000 | 69.570 |
| 22 | 1000.000000000AS | 10.050000000 | CAF2HL | 1.55840983 | 71.052 |
| 23 | 879.406688064 | 16.000000000 | | 1.00000000 | 71.890 |
| 24 REFL | 0.000000000 | 0.000000000 | | −1.00000000 | 96.787 |
| 25 | 0.000000000 | −115.000000000 | | −1.00000000 | 74.222 |
| 26 | −387.516557345AS | −27.129832704 | CAF2HL | −1.55840983 | 98.514 |
| 27 | 1263.022110690 | −186.102394066 | | −1.00000000 | 98.867 |
| 28 | −690.628264639AS | −15.000000000 | CAF2HL | −1.55840983 | 102.433 |
| 29 | −407.743339100 | −35.246393088 | | −1.80000000 | 101.928 |
| 30 | 383.731173821 | −19.625368283 | CAF2HL | −1.55840883 | 102.844 |
| 31 | 238.682085408 | −83.913320483 | | −1.00000000 | 104.479 |
| 32 | −271.062478143AS | −15.000000000 | CAF2HL | −1.55840983 | 105.116 |
| 33 | −178.866464554 | −22.496635875 | | −1.00000000 | 101.752 |
| 34 | −345.905496963 | −20.720656560 | CAF2HL | −1.55840983 | 103.056 |
| 35 | −1260.806494590AS | −50.572205465 | | −1.00000000 | 103.163 |
| 36 | −213.788545494 | −15.000000000 | CAF2HL | −1.55840983 | 108.438 |
| 37 | −161.616131570 | −28.162893461 | | −1.00000000 | 104.606 |
| 38 | −243.376245979 | −30.050000000 | CAF2HL | −1.55840983 | 108.336 |
| 39 | −997.537713559 | −27.999119709 | | −1.00000000 | 107.974 |
| 40 | 0.000000000 | 19.378976338 | | −1.00000000 | 108.178 |
| 41 | −221.596597190 | −60.366867301 | CAF2HL | −1.55840983 | 109.798 |
| 42 | 290.352439402 | −4.505755739 | | −1.00000000 | 108.782 |
| 43 | 331.650505057AS | −11.520989587 | CAF2HL | −1.55840983 | 105.793 |
| 44 | −175.081969310 | −17.226011022 | | −1.00000000 | 99.311 |
| 45 | −271.118424040 | −46.851037860 | CAF2HL | −1.55840983 | 100.730 |
| 46 | 412.187641571 | −1.300000000 | | −1.00000000 | 100.766 |
| 47 | −190.292990072 | −32.533359707 | CAF2HL | −1.55840983 | 95.267 |
| 48 | −1363.884435500 | −1.300000000 | | −1.00000000 | 92.363 |
| 49 | −131.363968136 | −69.593490888 | CAF2HL | −1.55840983 | 81.215 |
| 50 | −426.297130976 | −1.300000000 | | −1.00000000 | 56.788 |
| 51 | −149.214456329AS | −35.314668184 | CAF2HL | −1.55840983 | 51.750 |
| 52 | 1336.999089640 | −0.968000000 | | −1.00000000 | 35.666 |
| 53 | 0.000000000 | −8.900000000 | CAF2HL | −1.55840983 | 33.468 |
| 54 | 0.000000000 | −7.999721037 | | −1.00000000 | 28.070 |
| 55 | 0.000000000 | −0.000279079 | | −1.00000000 | 17.001 |

TABLE 8

ASPHERICITY CONSTANTS

SURFACE NO. 7

| K | 0.0000 |
|---|---|
| C1 | 4.68414771e−009 |
| C2 | −6.62163091e−014 |
| C3 | 2.76086815e−018 |
| C4 | −2.63086545e−022 |
| C5 | 1.21701730e−026 |

SURFACE NO. 9

| K | 0.0000 |
|---|---|
| C1 | −8.49526728e−009 |
| C2 | 1.46991649e−013 |
| C3 | −9.19545284e−019 |
| C4 | −4.08494369e−023 |
| C5 | 8.03965330e−028 |

SURFACE NO. 11

| K | 0.0000 |
|---|---|
| C1 | 1.29135127e−008 |
| C2 | −3.56616820e−013 |

TABLE 8-continued

ASPHERICITY CONSTANTS

| C3 | 5.64444758e−018 |
|---|---|
| C4 | −1.13779482e−022 |
| C5 | −2.14851239e−027 |

SURFACE NO. 17

| K | 0.0000 |
|---|---|
| C1 | 1.29135127e−008 |
| C2 | −3.56616820e−013 |
| C3 | 5.64444758e−018 |
| C4 | −1.13779482e−022 |
| C5 | −2.14851239e−027 |

SURFACE NO. 19

| K | 0.0000 |
|---|---|
| C1 | −8.49526728e−009 |
| C2 | 1.46991649e−013 |
| C3 | −9.19545284e−019 |
| C4 | −4.08494369e−023 |
| C5 | 8.03965330e−028 |

TABLE 8-continued

ASPHERICITY CONSTANTS

SURFACE NO. 22

| | |
|---|---|
| K | 0.0000 |
| C1 | 4.68414771e−009 |
| C2 | −6.62163091e−014 |
| C3 | 2.76086815e−018 |
| C4 | −2.63086545e−022 |
| C5 | 1.21701730e−026 |

SURFACE NO. 26

| | |
|---|---|
| K | 0.0000 |
| C1 | 4.27837090e−009 |
| C2 | 9.41323539e−015 |
| C3 | 3.42176064e−018 |
| C4 | −2.39037414e−022 |
| C5 | 7.66478348e−027 |

SURFACE NO. 28

| | |
|---|---|
| K | 0.0000 |
| C1 | 4.90943141e−009 |
| C2 | 2.76604959e−013 |
| C3 | −2.16077961e−018 |
| C4 | −2.14444839e−022 |
| C5 | 4.07346973e−027 |

SURFACE NO. 32

| | |
|---|---|
| K | 0.0000 |
| C1 | 5.54139264e−009 |
| C2 | 2.29676060e−013 |
| C3 | −6.61657360e−018 |
| C4 | −7.83287256e−023 |
| C5 | 4.36222467e−026 |

SURFACE NO. 35

| | |
|---|---|
| K | 0.0000 |
| C1 | −1.04122178e−008 |
| C2 | 5.20818328e−013 |
| C3 | −1.03593610e−018 |
| C4 | −4.02283381e−022 |
| C5 | 5.79141963e−026 |

SURFACE NO. 43

| | |
|---|---|
| K | 0.0000 |
| C1 | 2.50159590e−008 |
| C2 | −1.47677195e−012 |
| C3 | 6.69283996e−017 |
| C4 | −2.42823961e−021 |
| C5 | 5.93000140e−026 |

SURFACE NO. 51

| | |
|---|---|
| K | 0.0000 |
| C1 | 1.03707501e−007 |
| C2 | 1.08890239e−011 |
| C3 | 2.15614036e−016 |
| C4 | −9.42444340e−021 |
| C5 | −5.86112148e−024 |

What is claimed is:

1. A catadioptric projection lens for imaging a pattern situated in an object plane onto an image plane while creating a real intermediate image, comprising, between the object plane and image plane:

a catadioptric first lens section having a concave mirror;
a beam-deflection device; and
a second lens section that is arranged following the catadioptric lens section;
wherein the beam-deflection device has a first reflecting surface for deflecting radiation coming from the object plane toward the concave mirror;
wherein a positive refractive power is arranged in an optical near-field of the object plane, between the first reflecting surface and the concave mirror;
wherein a second reflecting surface for deflecting radiation coming from the concave mirror toward the image plane is provided;
wherein the intermediate image is arranged prior to light which forms the intermediate image being reflected by the second reflecting surface;
wherein at least one lens is arranged between the intermediate image and the second reflecting surface; and
wherein positive refractive power is arranged between the concave mirror and the intermediate image within an optical near-field of the intermediate image.

2. A projection lens according to claim 1, wherein, within the optical near-field of the object plane, a principal-ray height at an outermost field point of the image exceeds a marginal-ray height.

3. A projection lens according to claim 1, wherein at least one lens having at least one aspherical surface is arranged between the intermediate image and the second reflecting surface.

4. A projection lens according to claim 1, wherein the second reflecting surface is arranged following a first lens of the second lens section.

5. A projection lens according to claim 1, wherein the intermediate image is overcorrected for spherical aberration.

6. A projection lens according to claim 1, wherein a positive refractive power arranged between the first reflecting surface and the concave mirror and a positive refractive power arranged between the concave mirror and the intermediate image are provided by at least one of at least one lens that is transited twice and at least one multigrade lens.

7. A projection lens according to claim 1, wherein at least one lens or lens group is arranged outside the optical near-field of the object plane, in a central zone between the first reflecting surface and the concave mirror.

8. A projection lens according to claim 7, wherein the lens or lens group arranged in the central zone has a positive refractive power.

9. A projection lens according to claim 1, wherein the first reflecting surface is assigned to a first illuminated area and the second reflecting surface is assigned to a second illuminated area, and wherein a projection of the first illuminated area and a projection of the second illuminated area along a segment of the optical axis associated with the concave mirror overlap one another.

10. A projection lens according to claim 1, wherein the catadioptric first lens section has a magnification, $\beta_M$, of $\beta_M > 0.95$.

11. A projection lens according to claim 1, wherein the first reflecting surface is inclined at an angle with respect to the optical axis of the projection lens that substantially differs from 45°.

12. A projection lens according to claim 1, wherein incidence angles of radiation incident on the first reflecting surface do not exceed $\alpha_0$, where $\alpha_0$ is given by $$\alpha_0 = |\arcsin(\beta * NA)| + \frac{\alpha_{HOA}}{2},$$

where $\beta$ is the magnification of the projection lens, NA is the image-end numerical aperture, and $\alpha_{HOA}$ is the included angle between a segment of the optical axis running orthogonal to the image plane and a segment of the optical axis created by the folding thereof occurring at the first reflecting surface.

13. A projection lens according to claim 1, wherein a multigrade lens that has a first lens zone that is transited in a first transmission direction and a second lens zone that is transited in a second transmission direction is arranged in a zone that is transited twice, where the first lens zone and second lens zone do not overlap one another on at least one side of the lens.

14. A projection lens according to claim 1, wherein no positive refractive power is arranged within a space between the object plane and the first reflecting surface.

15. A projection lens according to claim 1, wherein at most a slight amount of refractive power is arranged between the object plane and the first reflecting surface.

16. A projection lens according to claim 1, wherein a first optical element that immediately follows the object plane has an essentially planar entrance surface.

17. A projection lens according to claim 1 that is telecentric on both its object end and its image end.

18. A projection lens according to claim 1 that is configured for use with ultraviolet light falling within a wavelength range extending from about 120 nm to about 260 nm.

19. A projection lens according to claim 1 that has an image-end numerical aperture exceeding 0.7.

20. A projection-exposure system for use in microlithography having an illumination system and a catadioptric projection lens, wherein the catadioptric projection lens is configured to image a pattern situated in an object plane onto an image plane while creating a real intermediate image, comprising, between the object plane and image plane:
    a catadioptric first lens section having a concave mirror;
    a beam-deflection device; and
    a second lens section that is arranged following the catadioptric lens section;
    wherein the beam-deflection device has a first reflecting surface for deflecting radiation coming from the object plane toward the concave mirror;
    wherein a positive refractive power is arranged in an optical near-field of the object plane, between the first reflecting surface and the concave mirror;
    wherein a second reflecting surface for deflecting radiation coming from the concave mirror toward the image plane is provided;
    wherein the intermediate image is arranged prior to light which forms the intermediate image being reflected by the second reflecting surface;
    wherein at least one lens is arranged between the intermediate image and the second reflecting surface; and
    wherein positive refractive power is arranged between the concave mirror and the intermediate image within an optical near-field of the intermediate image.

21. A method for fabricating semiconductor devices or other types of microdevices, comprising:
    providing a mask having a prescribed pattern;
    illuminating the mask with ultraviolet light having a prescribed wavelength; and
    projecting an image of the pattern onto a photosensitive substrate arranged in the vicinity of the image plane of a projection lens using a catadioptric projection lens, comprising:
    a catadioptric first lens section having a concave mirror;
    a beam-deflection device; and
    a second lens section that is arranged following the catadioptric lens section;
    wherein the beam-deflection device has a first reflecting surface for deflecting radiation coming from the object plane toward the concave mirror;
    a positive refractive power is arranged in an optical near-field of the object plane, between the first reflecting surface and the concave mirror; and
    a second reflecting surface for deflecting radiation coming from the concave mirror toward the image plane is provided;
    wherein the intermediate image is arranged prior to light which forms the intermediate image being reflected by the second reflecting surface;
    wherein at least one lens is arranged between the intermediate image and the second reflecting surface; and
    wherein positive refractive power is arranged between the concave mirror and the intermediate image within an optical near-field of the intermediate image.

22. A catadioptric projection lens for imaging a pattern situated in an object plane onto an image plane while creating a real intermediate image, comprising, between the object plane and the image plane:
    a catadioptric first lens section having a concave mirror;
    a beam-deflection device; and
    a second lens section that is arranged following the catadioptric lens section;
    wherein the beam-deflection device has a first reflecting surface for deflecting radiation coming from the object plane toward the concave mirror;
    wherein a positive refractive power is arranged in an optical near-field of the object plane, between the first reflecting surface and the concave mirror where a principal-ray height exceeds a marginal-ray height;
    wherein a second reflecting surface for deflecting radiation coming from the concave mirror toward the image plane is provided;
    wherein the intermediate image is arranged prior to light which forms the intermediate image being reflected by the second reflecting surface; and
    wherein at least one lens having at least one aspherical surface is arranged between the intermediate image and the second reflecting surface.

23. A projection lens according to claim 22, wherein the second reflecting surface is arranged following a first lens of the second lens section.

24. A projection lens according to claim 22, wherein positive refractive power is arranged between the concave mirror and the intermediate image within an optical near-field of the intermediate image where a principal-ray height exceeds a marginal-ray height.

25. A projection lens according to claim 22, wherein the intermediate image is overcorrected for spherical aberration.

26. A projection lens according to claim 22, wherein a positive refractive power arranged between the first reflecting surface and the concave mirror and a positive refractive power arranged between the concave mirror and the intermediate image are provided by at least one of at least one lens that is transited twice and at least one multigrade lens.

27. A projection lens according to claim 22, wherein at least one lens or lens group is arranged outside the optical near-field of the object plane, in a central zone between the first reflecting surface and the concave mirror.

28. A projection lens according to claim 27, wherein the lens or lens group arranged in the central zone has a positive refractive power.

29. A catadioptric projection lens for imaging a pattern situated in an object plane onto an image plane while creating a real intermediate image, comprising, between the object plane and the image plane:

a catadioptric lens section having a concave mirror;

a dioptric lens section that is arranged following the catadioptric lens section;

wherein a first reflecting surface is arranged for deflecting radiation coming from the object plane toward the concave mirror;

wherein a second reflecting surface is arranged for deflecting radiation coming from the concave mirror toward the image plane;

wherein the intermediate image is arranged prior to light which forms the intermediate image being reflected by the second reflecting surface;

wherein at least one lens is arranged between the intermediate image and the second reflecting surface; and wherein positive refractive power is arranged between the concave mirror and the intermediate image within an optical near-field of the intermediate image.

30. A projection lens according to claim 29, wherein at least one lens is arranged between the intermediate image and the second reflecting surface.

31. A projection lens according to claim 29, wherein at least one lens having at least one aspherical surface is arranged between the intermediate image and the second reflecting surface.

32. A projection lens according to claim 29, wherein the second reflecting surface is arranged following a first lens of the dioptric lens section.

33. A projection lens according to claim 29, wherein positive refractive power is arranged between the concave mirror and the intermediate image within an optical near-field of the intermediate image where a principal-ray height exceeds a marginal-ray height.

34. A projection lens according to claim 29, wherein the intermediate image is overcorrected for spherical aberration.

35. A projection lens according to claim 29, wherein a positive refractive power arranged between the first reflecting surface and the concave mirror and a positive refractive power arranged between the concave mirror and the intermediate image are provided by at least one of at least one lens that is transited twice and at least one multigrade lens.

36. A catadioptric projection lens for imaging a pattern situated in an object plane onto an image plane while creating a real intermediate image, comprising, between the object plane and image plane:

a catadioptric first lens section having a concave mirror;

a beam-deflection device; and a second lens section that is arranged following the catadioptric lens section;

wherein the beam-deflection device has a first reflecting surface for deflecting radiation coming from the object plane toward the concave mirror;

wherein a positive refractive power is arranged in an optical near-field of the object plane, between the first reflecting surface and the concave mirror;

wherein a second reflecting surface for deflecting radiation coming from the concave mirror toward the image plane is provided;

wherein the intermediate image is arranged prior to light which forms the intermediate image being reflected by the second reflecting surface; and wherein the intermediate image is overcorrected for spherical aberration.

37. A catadioptric projection lens for imaging a pattern situated in an object plane onto an image plane while creating a real intermediate image, comprising, between the object plane and the image plane:

a catadioptric lens section having a concave mirror;

a dioptric lens section that is arranged following the catadioptric lens section;

wherein a first reflecting surface is arranged for deflecting radiation coming from the object plane toward the concave mirror;

wherein a second reflecting surface is arranged for deflecting radiation coming from the concave mirror toward the image plane;

wherein the intermediate image is arranged prior to light which forms the intermediate image being reflected by the second reflecting surface; and wherein the intermediate image is overcorrected for spherical aberration.

* * * * *